(12) United States Patent
Leinonen et al.

(10) Patent No.: US 7,477,915 B2
(45) Date of Patent: Jan. 13, 2009

(54) INTEROPERABILITY IMPROVEMENT BETWEEN RECEIVERS AND TRANSMITTERS IN A MOBILE STATION

(75) Inventors: Marko Leinonen, Oulu (FI); Juha Valtanen, Oulu (FI); Jarkko Mykkänen, Oulu (FI)

(73) Assignee: Nokia Corporation, Espoo (FI)

( * ) Notice: Subject to any disclaimer, the term of this patent is extended or adjusted under 35 U.S.C. 154(b) by 239 days.

(21) Appl. No.: 11/141,838

(22) Filed: May 31, 2005

(65) Prior Publication Data

US 2006/0135195 A1 Jun. 22, 2006

Related U.S. Application Data

(63) Continuation-in-part of application No. 11/020,981, filed on Dec. 22, 2004, now abandoned.

(51) Int. Cl.
 *H04M 1/00* (2006.01)
(52) U.S. Cl. .................. 455/550.1; 455/78; 455/82; 455/83
(58) Field of Classification Search ............ 455/78, 455/82, 83, 550.1, 575.7, 553.1, 132, 303, 455/306, 307
 See application file for complete search history.

(56) References Cited

U.S. PATENT DOCUMENTS

| | | | | |
|---|---|---|---|---|
| 6,442,375 | B1 | 8/2002 | Parmentier | 455/78 |
| 6,549,567 | B1 | 4/2003 | Fullerton | 375/219 |
| 6,970,681 | B2 * | 11/2005 | Darabi et al. | 455/73 |
| 6,975,667 | B2 | 12/2005 | Mattisson et al. | 375/132 |
| 2002/0010763 | A1 | 1/2002 | Salo et al. | 709/220 |
| 2003/0072257 | A1 * | 4/2003 | Ikedo et al. | 370/208 |
| 2003/0236065 | A1 | 12/2003 | Leinonen et al. | 455/3.05 |
| 2005/0215204 | A1 | 9/2005 | Wallace et al. | 455/78 |
| 2006/0128425 | A1 * | 6/2006 | Rooyen | 455/552.1 |
| 2006/0294205 | A1 * | 12/2006 | Aaltonen et al. | 709/219 |

FOREIGN PATENT DOCUMENTS

| | | |
|---|---|---|
| EP | 1180851 A2 | 2/2002 |
| GB | 2360655 A | 9/2001 |
| WO | WO 01/39576 A1 | 6/2001 |

OTHER PUBLICATIONS

Public Safety PSWN Program Wireless Network "Public Safety Radio Frequency Spectrum Digital Television Transition Status Update" Jan. 2002, pp. 1-14.
Scott, J. H., "The How and Why of COFDM", Tutorial-COFDM, EBU Technical Review—Winter 1998, pp. 1-14.

(Continued)

*Primary Examiner*—Tuan A Pham
(74) *Attorney, Agent, or Firm*—Harrington & Smith, PC

(57) ABSTRACT

Techniques are disclosed for improving the interoperability of transmitters and receivers in a mobile station. Certain exemplary techniques involve performing filtering in a transmitter in response to a notification that a receiver is able to receive a reception frequency band. Other exemplary techniques involve changing one or more inputs of one or more devices in a receiver in response to a transmission by a transmitter. Still other exemplary techniques are disclosed.

45 Claims, 14 Drawing Sheets

OTHER PUBLICATIONS

Eriksson, M., "Evaluation of Packet-by-Packet Downlink Radio Resource Management Schemes", VTC'01, Rhodes, Greece, Jun. 6-9, 2001.

Eriksson, M., "Dynamic Single Frequency Networks", IEEE Journal on Selected Areas in Communications, vol. 19, No. 10, Oct. 2001, pp. 1905-1914.

Nokia Connecting People, "Future Technology STC", Copyright © Nokia Multimedia Terminals Oy 2000.

"Digital Video Broadcasting (DVB); Framing Structure, channel coding and modulation for digital terrestrial television." Draft EN 300 744 v1.2.1 (Jan. 1999) European Standard, pp. 1-47, Telecommunications Series. European Broadcasting Union.

Junko Yoshida, "Nokia Redefines Digital TV as a Mobile Device" pp. 1-4, EE Times Apr. 22, 2002.

Hamacher, C., "Spectral Coexistence of DVB-T and UMTS in a Hybrid Radio System", Sep. 2001.

Huschke, J. et al., "Guard Band Coordination of Areas with Differing Spectrum Allocation", Sep. 2001.

\* cited by examiner

INTEROPERABILITY IMPROVEMENT BETWEEN RECEIVERS AND TRANSMITTERS IN A MOBILE STATION

CROSS-REFERENCE TO RELATED APPLICATIONS

The present application is a continuation-in-part of U.S. patent application Ser. No. 11/020,981, filed on Dec. 22, 2004 now abandonded.

TECHNICAL FIELD

This invention relates generally to mobile communications and, more specifically, relates to receiving and transmitting in a mobile station.

BACKGROUND OF THE INVENTION

Terrestrial digital video broadcasting (DVB-T) was first adopted as a standard in 1997, and has been deployed throughout many areas of the world. DVB-T offers about 24 megabits per second (Mb/s) data transfer capability to a fixed receiver, and about 12 Mb/s to receivers in mobile stations. Mobile stations including such mobile receivers have been made and are able to receive the DVB-T signals.

While DVB-T allows high quality video broadcasting to be delivered to various devices, the DVB-T standard has certain problems with respect to mobile stations. One such problem is power usage, as mobile stations that implement DVB-T tend to consume too much power. Since mobile stations are battery powered unless plugged into a secondary power source, power usage is a critical design element. In response to this power usage and other effects of DVB-T, the DVB-H (a version of DVB for handheld devices) standard was created. DVB-H offers, among other things, reduced power usage as compared to DVB-T.

Because of the benefits of DVB-H over DVB-T, DVB-H is beginning to make inroads into the mobile station market. For example, Crown Castle and Nokia are piloting DVB-H technology in the United States in order to bring television (TV)-like services to mobile devices. The pilot has started in October, 2004 in the Pittsburgh, Pa. area, and the pilot aims to prove and test the feasibility of DVB-H technology and related service systems in the United States.

While DVB-H is an improvement over DVB-T, DVB-H also causes certain problems. For instance, a mobile station typically will contain at least one transmitter that transmits using one or more frequency bands. The DVB-H receiver also receives in a frequency band that is different than the one or more frequency bands used by any transmitter in the mobile station. For instance, certain mobile stations can support the global system for mobile communications (GSM) standard, and the frequency bands used by a GSM transmitter are different that the frequency band used by a DVB-H receiver. Nonetheless, transmitting using one frequency band can still cause interference in the frequency band used by the DVB-H receiver.

It would therefore be desirable to provide techniques that can reduce this interference and therefore improve interoperability between transmitters and receivers in a mobile station.

BRIEF SUMMARY OF THE INVENTION

The foregoing and other problems are improved upon, and other advantages are realized, in accordance with exemplary embodiments of these teachings. In particular, the present invention provides techniques that improve interoperability between transmitters and receivers in a mobile station.

In an exemplary aspect of the invention, exemplary embodiments are disclosed that perform filtering in a transmitter to improve interoperability. For instance, in one exemplary embodiment, a mobile station is disclosed that comprises a first antenna and at least one second antenna. The mobile station additionally comprises a receiver coupled to the first antenna. The receiver comprises first control logic adapted to generate a notification of the receiver being able to receive a reception frequency band. The mobile station also comprises a transmitter coupled to the at least one second antenna and the receiver. The transmitter communicates radio frequency (RF) signals in a selected one of at least one transmission frequency bands over an RF transmit path to the at least one second antenna. The transmitter comprises second control logic, at least one filter, and at least one switch. The at least one switch is coupled to the RF transmit path, the at least one filter, and the second control logic. The at least one switch is adapted to modify the RF transmit path to couple a given one of the at least one filters to or decouple the given filter from the RF transmit path. The second control logic is responsive to the notification to cause the at least one switch to modify the RF transmit path to couple the given filter to the RF transmit path.

In another exemplary embodiment, a method is disclosed for operating a transmitter coupled to at least one second antenna in combination with a receiver coupled to a first antenna. The method comprises the following steps. A notification is generated of the receiver being able to receive a reception frequency band from the first antenna. In response to the notification, a radio frequency (RF) transmit path is modified to couple a given one of at least one filters to or decouple the given filter from the RF transmit path. Information is transmitted in a selected one of at least one transmission frequency bands and through the modified RF transmit path to the at least one second antenna.

In another exemplary embodiment, a signal bearing medium is disclosed that comprises a program of machine-readable instructions executable by an apparatus to perform operations. The operations are for operating a transmitter coupled to at least one second antenna in combination with a receiver coupled to a first antenna. The operations comprise the following steps. A notification is generated of the receiver being able to receive a reception frequency band from the first antenna. In response to the notification, a radio frequency (RF) transmit path is modified to couple a given one of at least one filters to or decouple the given filter from the RF transmit path. Information is transmitted in a selected one of at least one transmission frequency bands and through the modified RF transmit path to the at least one second antenna.

In another aspect of the invention, exemplary embodiments are disclosed that change one or more inputs for one or more devices in a receiver to improve interoperability. For instance, in an exemplary embodiment, a mobile station is disclosed. The mobile station comprises a first antenna and a second antenna. The mobile station additionally comprises a transmitter coupled to the first antenna. The transmitter comprises first control logic adapted to generate a notification of a transmission to the first antenna. The transmission uses a selected one of at least one transmission frequency bands. The mobile station also comprises a receiver coupled to the second antenna and to the transmitter. The receiver comprises second control logic and a plurality of devices. The second control logic is adapted to control the plurality of devices to receive information in a reception frequency band from the second antenna. The second control logic is responsive to the notification to modify at least one input used by at least a given one of the devices. The second control logic is further adapted to control the at least one given device and the rest of the plurality of devices to receive given information. The reception of the given information occurs for at least some time period while the transmitter transmits in the at least one transmission frequency band.

In another exemplary embodiment, a method is disclosed for operating a transmitter coupled to a first antenna in combination with a receiver coupled to a second antenna. The method comprises the following steps. A notification is generated of a transmission to the first antenna. The transmission uses a selected one of at least one transmission frequency bands. In response to the notification, a modification is performed of at least one input used by at least a given one of a plurality of devices in the receiver. Using the at least one given device and the rest of the plurality of devices, information is received in a second frequency band from the second antenna. The reception occurs for at least some time period while the transmitter transmits in the at least one transmission frequency band.

In another exemplary embodiment, a signal bearing medium is disclosed that comprises a program of machine-readable instructions executable by an apparatus to perform operations. The operations are for a transmitter coupled to a first antenna in combination with a receiver coupled to a second antenna. The operations comprise the following steps. A notification is generated of a transmission to the first antenna. The transmission uses a selected one of at least one transmission frequency bands. In response to the notification, a modification is performed of at least one input used by at least a given one of a plurality of devices in the receiver. Using the at least one given device and the rest of the plurality of devices, information is received in a second frequency band from the second antenna. The reception occurs for at least some time period while the transmitter transmits in the at least one transmission frequency band.

BRIEF DESCRIPTION OF THE DRAWINGS

The foregoing and other aspects of embodiments of this invention are made more evident in the following Detailed Description of Exemplary Embodiments, when read in conjunction with the attached Drawing Figures, wherein.

DETAILED DESCRIPTION OF EXEMPLARY EMBODIMENTS

Figure 1:
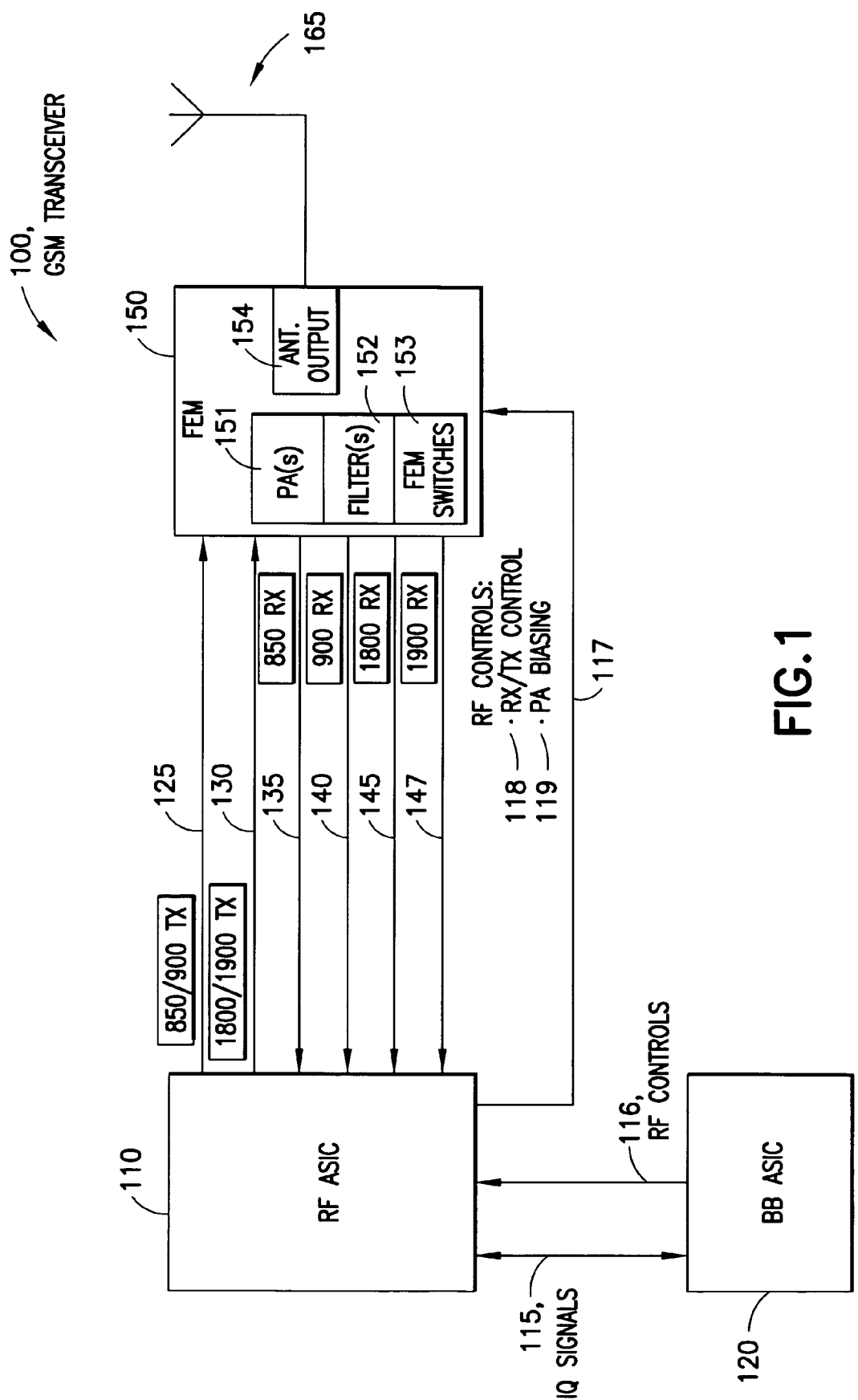
FIG. 1 is a block diagram of a GSM transceiver.

As previously described, the combination of a transmitter and a receiver in a mobile station can be problematic. A further introduction to these problems will now be given. In the examples below, the mobile station will be considered to have a GSM transmitter and a DVB-H receiver in the same mobile station, although the present invention is not limited to this configuration. A mobile station is any portable device having wireless capability, such as a cellular phone, a personal digital assistant (PDA) with cellular or bluetooth capability, and the like. The mobile station will typically be battery powered.

In terms of what an operator of the mobile station could experience while watching digital video using the mobile station, there are several factors to consider. The business case of the DVB-H operator is based on good quality video performance, and cellular connection is not allowed to effect video quality. Nonetheless, the mobile station performs cellular operations when delivering back channel information to the interactive DVB-H media and when the mobile station needs to connect to the base station. The mobile station needs to connect to the base station periodically.

When the mobile station transmits at a cellular frequency, DVB-H reception quality is decreased. This decrease can be seen as video flow being not constant or there being blurs in the picture. A DVB-H frequency band has a number of sub-carriers. The cellular transmission may destroy all sub-carriers at the same time or may destroy certain ones of the sub-carriers. For instance, GSM transmissions occur 4.6 milliseconds (ms) apart with 577 microseconds (μs) transmission time period. The DVB-H time duration of the useful part of a symbol without guard interval is for example for 5 MHz channel bandwidth, in 2k mode 358.4 μs, for 4k mode 716,8 μs, and 8k mode 1433.6 μs.

The recovery time from the cellular connection disturbance is not known, but this may be quite long. The recovery time is at least partially dependent on the algorithm for the automatic gain control (AGC) of the DVB-H receiver and the performance of the AGC with strong signals and humping wideband noise.

The interoperability problem between DVB-H in United States and the cellular frequency bands will be one of the biggest issues after service using DVB-H is launched. Both cellular bands for reception of GSM will generate problems to DVB-H band which is located between those in frequency domain. The following table illustrates exemplary transmission and reception bands for GSM and DVB-H, where "MHz" is megahertz, "U.S." is United States, and "E.U." is European Union.

| | | |
|---|---|---|
| Lower GSM Frequency Band in U.S. (GSM850) | Transmission Reception | 824-849 MHz 869-894 MHz |
| Lower GSM Frequency Band in EU (GSM900) | Transmission Reception | 880-915 MHz 935-960 MHz |

-continued

| | | |
|---|---|---|
| Higher GSM Frequency Band in U.S. (GSM1900) | Transmission Reception | 1850-1910 MHz 1930-1990 MHz |
| Higher GSM Frequency Band in EU (GSM1800) | Transmission Reception | 1710-1785 MHz 1805-1880 MHz |
| Frequency band in EU (WCDMA2100) | Transmission Reception | 1920-1980 MHz 2110-2170 MHz |
| DVB-H Band in U.S. | Reception | 1670-1675 MHz |
| DVB-H Band in E.U. | Reception | 470-702 MHz |

The higher US GSM frequency band will generate wideband noise, which is higher than the minimum DVB-H signal level. The higher GSM frequency band (GSM1900, typically called the "1900 frequency band" herein) noise at the DVB-H frequency band is −121 dBm/Hz. The required noise level at the minimum DVB-H signal level is less than −169 dBm/Hz. The difference between actual and required levels is 48 dB. The assumption is that noise level is flat and the same level as the GSM reception band noise level.

In the European Union DVB-H version, the reception band is on the lower side of the GSM frequency band (GSM900, which is a transmission frequency band of 880-915 MHz) and the reception frequency band is far enough that 900 frequency band transmission is not band-blocking the DVB-H receiver. Nonetheless, the wide band noise may be a problem also in European DVB-H reception.

In terms of the U.S. standards, the 850 frequency band transmission will generate a second harmonic, which will be at the U.S. DVB-H reception frequency band of 1670-1675 MHz. Also, the 850 frequency band transmission will generate wide band noise to the U.S. DVB-H frequency band. The most difficult frequencies are 835.0-837.5 MHz in transmission, since these frequencies generate harmonics directly on top of the U.S. DVB-H frequency band.

The spurious frequencies near the DVB-H reception channel will be problematic since the channel filter is not filtering nearby spurious signals effectively from the DVB-H reception signal, because the receiver channel selection is designed so that next channel will be, depending on geographical area, either 5, 6, 7, or 8 MHz apart from the desired received signal. If there are interference signals nearer than channel raster 5, 6, 7, or 8 MHz then those interference signals may cause problems since the channel filter does not filter those completely. A 2.5 MHz band will include 12.5 GSM RF channels, which will create co-channel interference.

The same problem will occur with other U.S. cellular systems like code-division multiple access (CDMA) and time-division multiple access (TDMA). This is due to fact that spurious signal level requirement is −13 dBm by the Federal Communications Commission (FCC) and in GSM standard the spurious requirement is −36 dBm. In CDMA, transmission is always on, thus DVB-H reception is constantly distorted when CDMA is operating with mentioned difficult RF frequencies or near by frequencies.

In current DVB-H accessories (such as a video streaming device by Nokia called SU-22), this receiver desensitizing effect can be noticed when GSM transmission is on.

Possible solutions to these problems are as follows. One possible solution is increased filtering at the 850 and 1900 frequency band transmission signal paths. This is not a good solution in coming GSM transmitter architectures, since there will be only one low frequency band (e.g., the 850 and 900 frequency bands will be combined together) and one high frequency band (e.g., the 1800 and 1900 frequency bands will be combined together) will be used. Therefore, if for instance more filtering is added for the 1900 frequency band signals (which are used for transmission), then the 1800 frequency band signals are also filtered (which are used for reception).

For instance, FIG. 1 shows an exemplary GSM transceiver 100 of a mobile station. The GSM transceiver 100 is used for both transmission and reception of GSM signals. The GSM transceiver 100 comprises an RF application-specific integrated circuit (ASIC) 110, a base-band (BB) ASIC 120, and a front-end module (FEM) 150. The BB ASIC 120 and RF ASIC 110 communicate through in-phase and quadrature (IQ) signals 115 and RF controls 116. The RF ASIC 110 transmits two frequency bands, the 900 frequency band (e.g., in the 850/900 TX 125) and the 1900 frequency band (e.g., in the 1800/1900 TX 130) to the FEM. The FEM comprises one or more power amplifiers (PAs) 151, one or more filters 152 (e.g., harmonic filters), FEM switches 153, and an antenna output 154, coupled to antenna 165. The filters 152 can perform reception pre-filtering, and the FEM 150 communicates four reception frequency bands, the 850 RX 135, 900 RX 140, 1800 RX 145, and 1900 RX 147, to the RF ASIC 110. The FEM 150 and the RF ASIC 110 also communicate through RF controls 117, which include reception/transmission (RX/TX) control 118 and PA biasing 119. The RX/TX control 118 is a signal that indicates whether the FEM 150 is in a transmit (TX) or a reception (RX) mode. The PA biasing 119 is a signal that changes PA biasing of the one or more PAs 151.

As FIG. 1 shows, if more filtering is added for signals on the 1900 frequency band, then signals on the 1800 frequency band are also filtered. Similarly, if filtering is added for signals on the 900 frequency band, then signals on the 850 frequency band will also be filtered.

Yet another problem is as follows. The GSM 1800 transmission frequency band is from 1710 to 1785 MHz. The U.S. DVB-H reception frequency band is therefore about 40 MHz lower than the lowest GSM1800 transmission frequency band. The required filtering is about 50 dB, which means also noticeable loss at the GSM1800 lowest channel powers. The current trend is increase radiated terminal output powers and thus extra loss after the PA 151 is not beneficial if the loss occurs all the time. For instance, a frequency filter (e.g., at 1800/1900 MHz) with pass band to stop band roll-off like 35-40 MHz has easily a remarkable insertion loss, that degrades both transceiver transmit path and receiver path.

If the filtering is done prior to the PA 151, this does not solve the wide band noise problem because the PA 151 is significant source of noise. For instance, at the 850 frequency band, harmonics filtering prior to the PA 151 will not help the situation, since PA 151 is the main contributor to the harmonics.

Exemplary embodiments of the present invention improve interoperability between receivers and transmitter in a mobile station. In an aspect of the invention, filtering is used to filter certain frequencies of the transmission frequency band. In an exemplary embodiment, the filtering is performed only when the DVB-H receiver is able to receive, and this limits power loss due to filtering. In another aspect of the invention, in response to the transmitter transmitting (e.g., which can include preparations for transmitting), the DVB-H receiver modifies one or more inputs used by a device in the DVB-H receiver. The modification is performed to improve reception of DVB-H information while the transmitter is transmitting.

Figure 2:
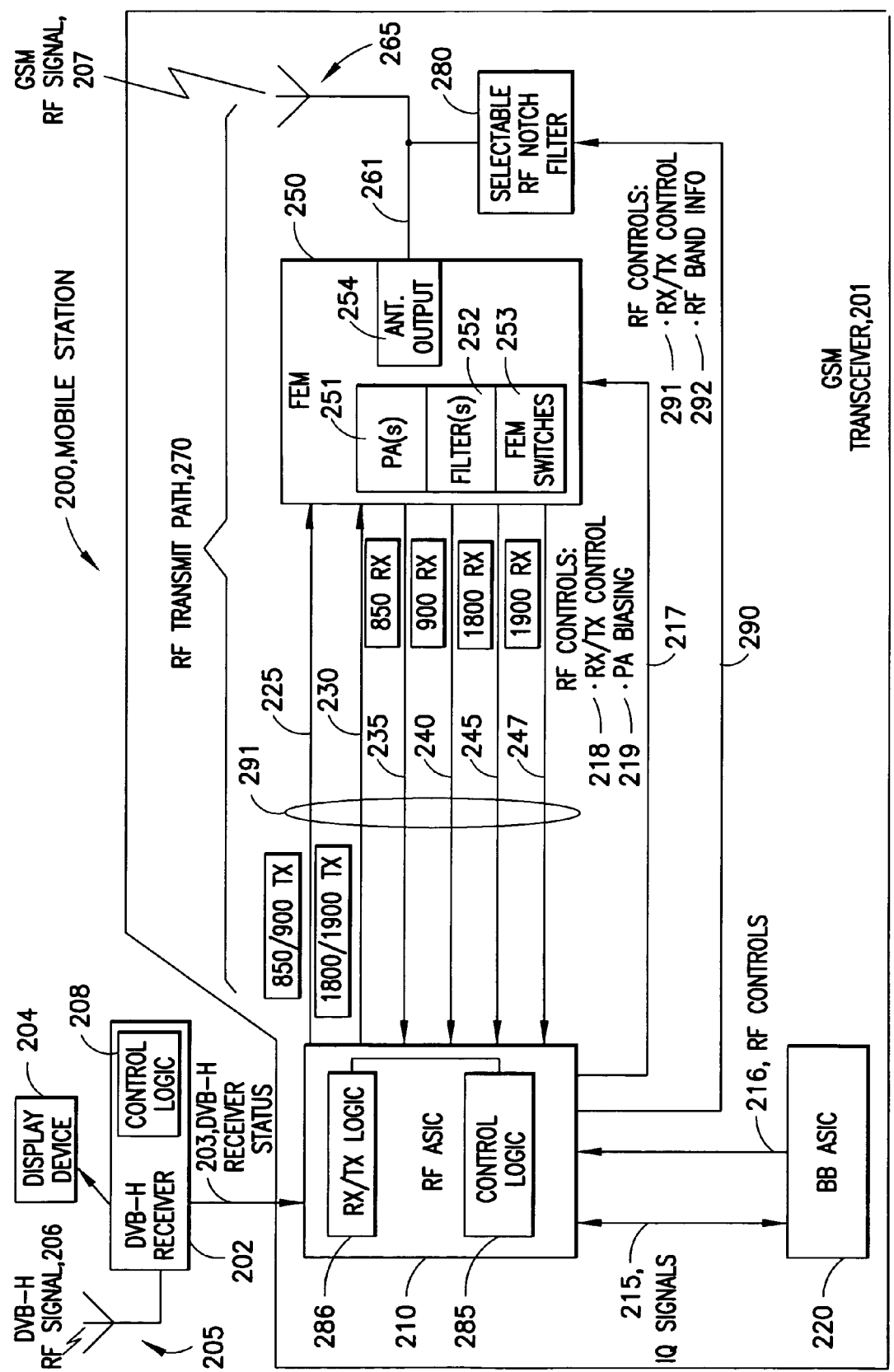
FIG. 2 is a block diagram of a mobile station in accordance with an exemplary embodiment of the present invention.

Referring now to FIG. 2, this figure shows a mobile station 200 in accordance with an exemplary embodiment of the present invention. The mobile station 200 comprises a GSM transceiver 201, a DVB-H receiver 202, a display device 204, and an antenna 205. The DVB-H receiver 208 comprises control logic 208 that controls operations of the DVB-H receiver 208, such as generating the DVB-H receiver status signal 203. The display device 204 displays at least information from the DVB-H receiver 202. The DVB-H receiver 202 is coupled to the RF ASIC 210 using DVB-H receiver status signal 203. The DVB-H receiver 202 receives a DVB-H RF signal 206 and converts this signal to information (not shown) suitable for display on the display device 204.

The exemplary GSM transceiver 201 is used for both transmission and reception of GSM RF signals 207 using antenna 265, but could be a transmitter only, if desired. The GSM transceiver 201 comprises an RF ASIC 210, a BB ASIC 220, a FEM 250, and a selectable RF notch filter 280, and the antenna 265. The antenna 265 need not be part of the GSM transceiver 201. The BB ASIC 220 and RF ASIC 210 communicate through in-phase and quadrature (IQ) signals (generally: I- and Q-signals comprise information that is to be transmitted or received) 215 and RF controls 216. The RF ASIC 210 is an RF device that creates and communicates RF signals using two frequency bands, the 850/900 TX 225 and the 1800/1900 TX 230 to the FEM. Note that the RF ASIC 210 may comprise multiple RF devices that create and communicate the RF signals. The FEM comprises one or more PAs 251, one or more filters 252, FEM switches 253, and an antenna output 254, coupled to antenna 265. The filters 252 can perform reception pre-filtering, and the FEM 250 communicates four reception frequency bands, the 850 RX 235, 900 RX 240, 1800 RX 245, and 1900 RX 247, to the RF ASIC 210. Typically signals 225, 230, 235, 240, 245, and 247 are individual signal lines. It should be noted that the frequency bands 225, 230, 235, 240, 245, and 247 are can be communicated using a bus 291. Typically, only one of the frequency bands 225-247 occupies the bus 291 at one time and the bus is made to hold only signals from a currently selected one of the frequency bands 225-247.

The FEM 250 and the RF ASIC 210 also communicate through RF controls 217, which include reception/transmission (RX/TX) control 218 and PA biasing signal 219. The RX/TX control 218 is a signal that indicates whether the FEM 250 is to be in a transmit (TX) or a reception (RX) mode. The PA biasing signal 219 is a signal that changes PA biasing of the one or more PAs 251. The RF ASIC 210 either the 850/900 TX 225 or the 1800/1900 TX 230 frequency bands to the antenna 265 using the RF transmit path 270. The RF transmit path 270 is any path through which RF signals may be routed for transmission. For instance, when the GSM transceiver 201 is transmitting using the 850/900 TX 225 frequency band, the RF transmit path 270 comprises the bus 291, the FEM 250, and the antenna coupling 261, and, optionally, the antenna 265. The RF ASIC 210 communicates to the selectable RF notch filter 280 using the RF controls 290, which include the RX/TX control 291 and RF band information 292. The RX/TX control 291 is a signal that indicates whether the FEM 250 is to be in a transmit (TX) or a reception (RX) mode, and may be a copy of the RX/TX control 218 if desired. Illustratively, the RF band information 292 is a signal having information used to determine which of the 850, 950, 1800, and 1900 frequency bands is being used.

Filtering of the transmission signals of one of the 850, 950, 1800, and 1900 frequency bands is done adaptively by using transmission on/off information (e.g., in the RX/TX control 291) and operating frequency band information (e.g., in the RF band information 292). In an exemplary embodiment, the filter used in the selectable RF notch filter 280 is a branch-selectable notch filter, which has multiple selections with multiple notch rejection specifications. Exemplary selectable RF notch filters 280 are shown in FIGS. 3-6A.

The DVB-H receiver status signal 203 can be used to determine when filtering is performed. In one exemplary embodiment, the DVB-H receiver status signal 203 is a signal indicating whether the DVB-H receiver 202 is in a reception mode. In response to the DVB-H receiver being in a reception mode, the GSM transceiver 201 performs filtering of transmitted GSM signals. In another exemplary embodiment, the DVB-H receiver 201 could be contained in a removable module (not shown). When the removable module is coupled to the mobile station 200, the DVB-H receiver status signal 203 indicates that the removable module is coupled to the mobile station 200, and the GSM transceiver 201 performs filtering of transmitted GSM signals in response to the DVB-H receiver status signal 203. Note that the DVB-H receiver status signal 203 could be determined through a query by the RF ASIC 210 to the DVB-H receiver 202.

When notch filtering is used, then higher losses can be expected in the signal communicated on the RF transmit path 270 to the antenna 265. Thus, notch filtering means lower radiated output power. For this reason, the extra notch filtering, in an exemplary embodiment, is used only when needed. Consequently, a notch is selected based on operating frequency band and a notch is typically selected only when transmission is on. The selectable RF notch filter 280 modifies the RF transmit path 270 to couple one or more filters to or decouple one or more filters from the RF transmit path 270. Since extra filtering increases loss to the RF transmit path 270, filtering is removed when GSM is in reception mode. This way, GSM sensitivity can be maintained.

The notch filtering in the 850 frequency band is typically performed for the second harmonic rejection and may be performed for wide band noise filtering (e.g., noise that is converted to 1670-1675 MHz frequency band). In 900/1800/1900 frequency bands, the filtering is done to suppress wide band noise. Noise from 900 MHz for EU DVB-H frequency band, and noise from 1800/1900 MHz to US DVB-H frequency band are wide band noise at their nature. A "notch filter" in this context is, e.g., a filter with a bandwidth sufficient to cover a DVB-H frequency band. This kind of filter can be referred as notch-filter, and noise can be referred as wideband noise. It is not an intention (though it is possible) to filter wideband, just a DVB-H frequency band (e.g., only US or EU) or frequency bands (e.g., both US and EU).]

Furthermore, the PA 251 can be linearized by changing the PA biasing signal 219 to cause the PA 251 to perform closer to or at class A operation. Typically, this means a value of current on the PA biasing signal 219 would be increased. Class A operation should reduce the magnitude of the harmonics. This more linear operation will consume more power and generate more heat, but this more linear mode is needed only when the GSM transceiver 201 is transmitting (e.g., which can include preparations to transmit) at the same time a DVB-H module is in reception mode. This way total current consumption is not increased significantly.

The control logic 285, as part of the RF ASIC 210, communicates the RF controls 290 to the selectable RF notch filter 280. The control logic 285 also, in one exemplary embodiment, controls operations of the GSM transceiver 701. It should be noted that a portion or all of the control logic 285 may reside in locations other than the RF ASIC 210, such as being distributed between the RF ASIC 210 and the BB ASIC 220 or being its own module separate from the RF ASIC 210 or the BB ASIC 220. Additionally, the control logic 285 can adjust the PA biasing signal 219. Note that a control logic portion can be added to the selectable RF notch filter 280, if desired, so that the selectable RF notch filter 280 will determine, using signals from the RF ASIC 210 and the DVB-H receiver 208, what filter should or should not be coupled to the antenna coupling 261. The RX/TX logic 286 determines whether the RF ASIC 210 is in a transmission or reception mode and informs the control logic 285 of the mode. The RX/TX logic 286 (e.g., and the control logic 285) would typically be part of control logic 285 for the RF ASIC 210.

Although the RF ASIC 210, BB ASIC 220, and FEM 250 are shown as being separate, portions or all of the three may be combined or further sub-divided. Additionally, some or all of the functionality of the three may be performed by processors such as a digital signal processor (DSP), hardware such as very large scale integrated circuits (VLSI), or programmable logic devices (e.g., using read only memories) such as field programmable gate arrays (FPLGA), or some combination of these or any other suitable device. The signals herein may be, for instance, signals that travel on conductive elements, such as traces or wires, or may be one or more messages that are passed between software modules.

Figure 3:
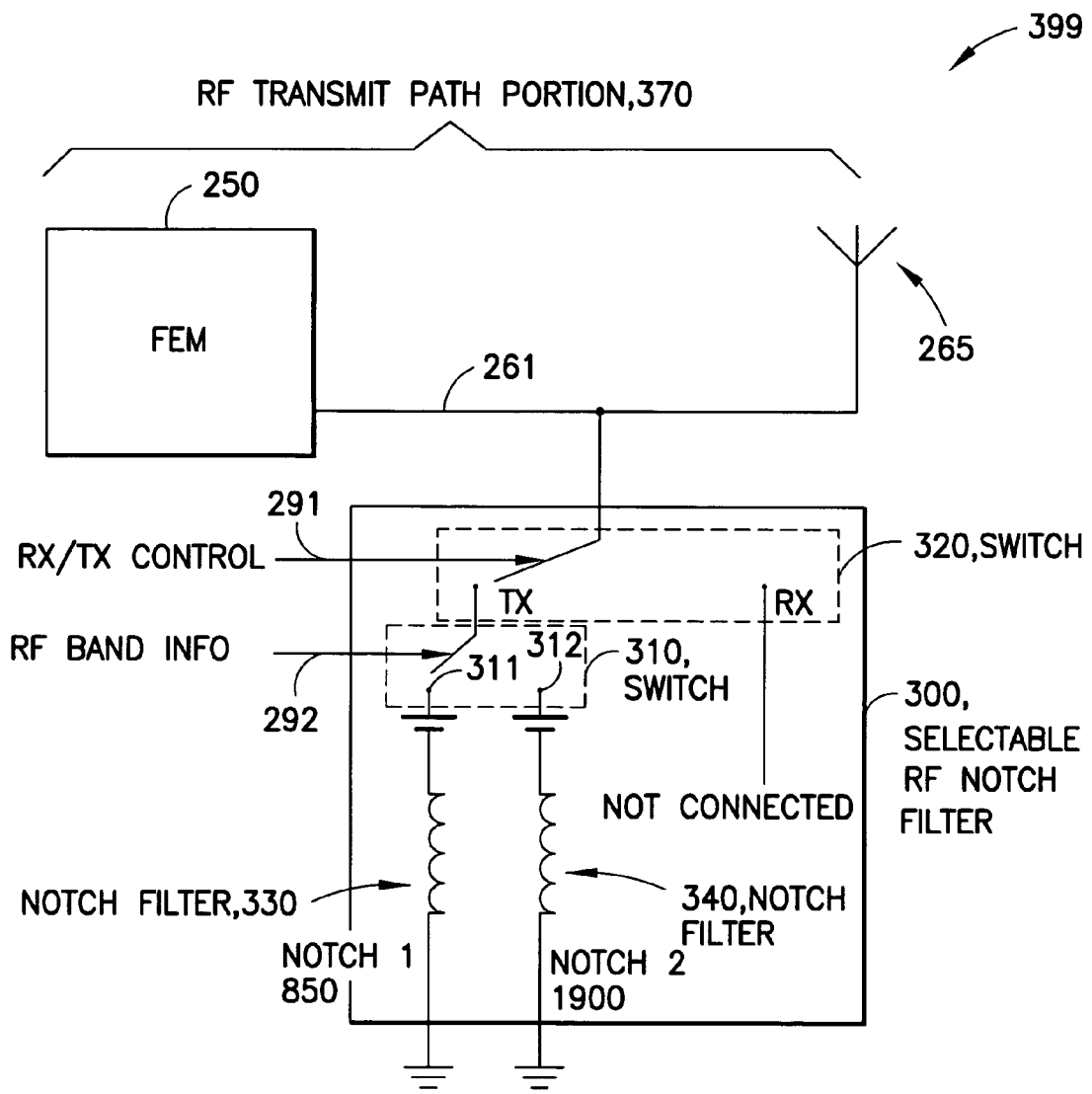
FIGS. 3-6A are block diagrams of exemplary portions, including RF transmit paths, of the mobile station of FIG. 2 and are used to illustrate filtering of GSM transmission signals.

Referring now to FIG. 3, a possible portion 399, including one exemplary RF transmit path portion 370, of the mobile station 200 of FIG. 2 is shown. RF transmit path portion 370 is a portion of RF transmit path 270. The portion 399 comprises the FEM 250, the antenna coupling 261, the selectable RF notch filter 300, and optionally the antenna 265. The selectable RF notch filter 300 comprises a switch 320 and a switch 310. In response to RX/TX control 291, the switch 320 switches between the RX connection (e.g., when the GSM transceiver 201 is in a reception mode) and the TX connection (e.g., when the GSM transceiver 201 is in a transmission mode). In response to the RF band information 292, the switch 310 switches between connection 311 (e.g., when the GSM transceiver 201 is transmitting using the GSM 850 frequency band), which couples a notch filter 330 to the RF transmit path portion 370, and the connection 312 (e.g., when the GSM transceiver 201 is transmitting using the GSM 1900 frequency band), which couples a notch filter 340 to the RF transmit path portion 370. Note that for the EU DVB-H system: the kind of functionality in FIG. 3 may be used at GSM 900 and 1800.

Thus, there are three different options for notch filter selection based on transmission or reception and operating frequency band:

Notch 1 (i.e., notch filter 330) option: Used when the GSM 850 frequency band is being used for transmission, and the filtering is performed for second harmonic and wide band noise filtering;

Notch 2 (i.e., notch filter 340) option: Used when the GSM 1900 frequency band is being used for transmission, and the filtering is performed for wideband noise filtering; and Not connected (i.e., the RX connection in switch 320, which connects to the not connected terminal 321) option: Used when the GSM transceiver 201 is in a reception mode. The not connected option does not add extra loss to the RF transmit path portion 370 and thus receiver sensitivity can be maintained.

The notch filters 330, 340 could be realized, for instance, with ceramic components or bulk acoustic wave (BAW) components, or micro-electromechanical switches (MEMS). The notch filters 330, 340 may also be realized using surface-mount devices (SMDs).

Figure 4:
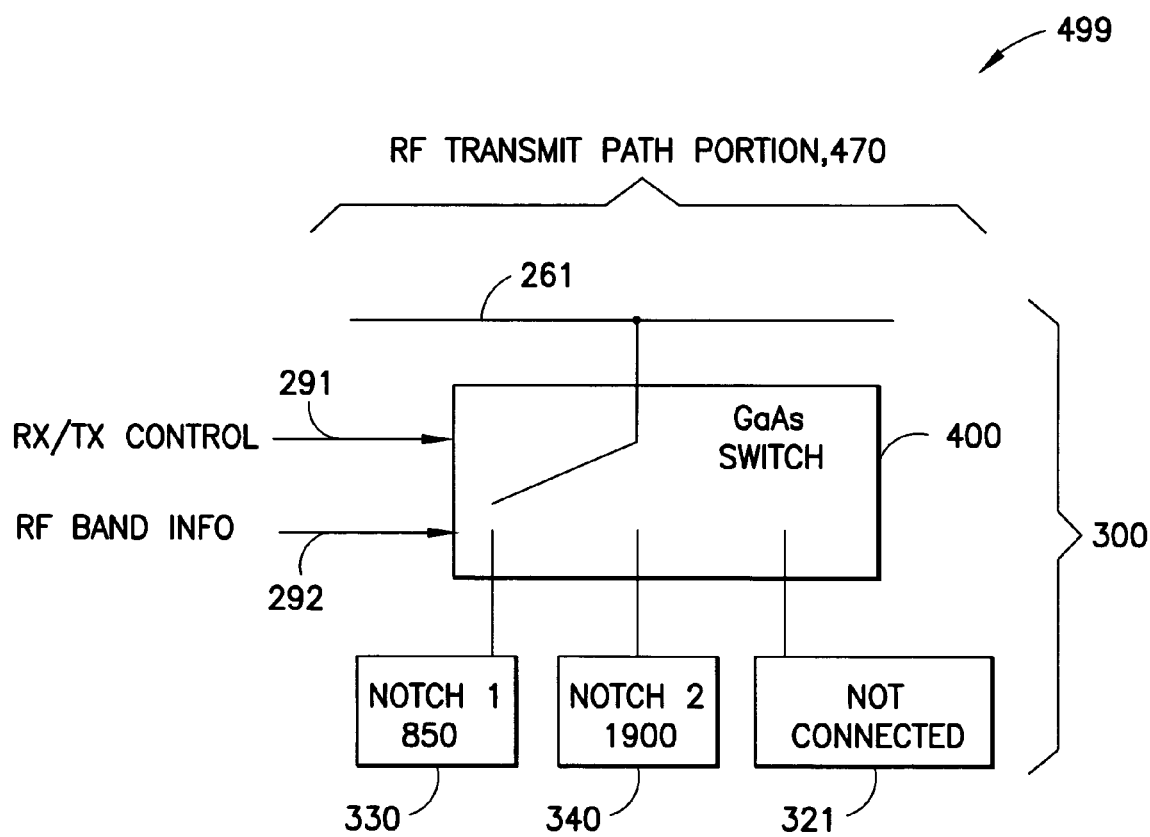

FIG. 4 shows another possible exemplary portion 499, including the RF transmit path portion 470, of the mobile station 200 of FIG. 2. Transmit path portion 470 is a portion of the RF transmit path 270 of FIG. 2. The exemplary portion 499 comprises a gallium arsenide (GaAs) switch 300 having three positions. The GaAs switch 400 is responsive to the RX/TX control 291 and the RF band information 292 to select one of the switches. Note that the RX/TX control 291 and the RF band information 292 may be combined into two control signals if desired. The GaAs switch 400 has a first position that couples the notch filter 330 to the antenna coupling 261, a second position that couples the notch filter 340 to the antenna coupling 261, and a third position that couples a not connected terminal to the antenna coupling 261.

Figure 5:
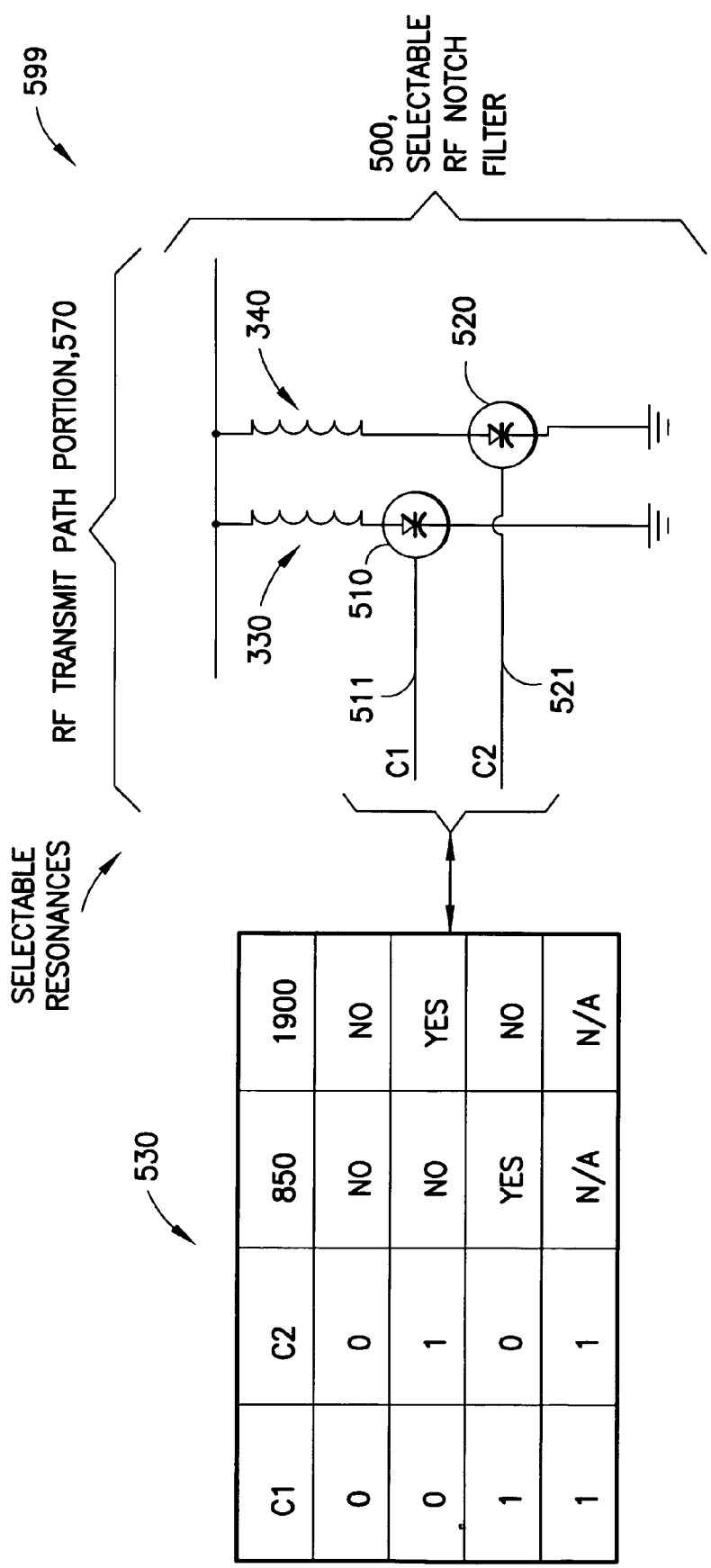

FIG. 5 shows another exemplary portion 599, including the RF transmit path portion 570, of the mobile station 200 of FIG. 2. Transmit path portion 570 is a portion of the RF transmit path 270 of FIG. 2. In the example of FIG. 5, the selectable RF notch filter 500 comprises two switches 510, 520, which could be GaAs FETs or PIN-diodes. Each switch 510, 520 has a corresponding control signal C1 511, C2 521. The control signals C1 511 and C2 521 are controlled as shown in table 530 of FIG. 5. In this example, when C1 511 is zero and C2 521 is zero, this is a not connected option. The Notch 1 option is chosen when C1 511 is one and C2 521 is zero, while the Notch 2 option is chosen when C1 511 is zero and C2 521 is one. One exemplary technique for generating the control signals C1 511 and C2 521 is by having the control logic 285 (see FIG. 2) generate the control signals C1 511 and C2 521 from data about whether the GSM transceiver 201 is transmitting and, if so, on what frequency band. The notch filters 330, 340 are selectable resonances. Note that control logic could be built into the selectable RF notch filter 500 so that the selectable RF notch filter generates the control signals C1 511 and C2 521 based on signals from the RF ASIC 210.

Figure 6:
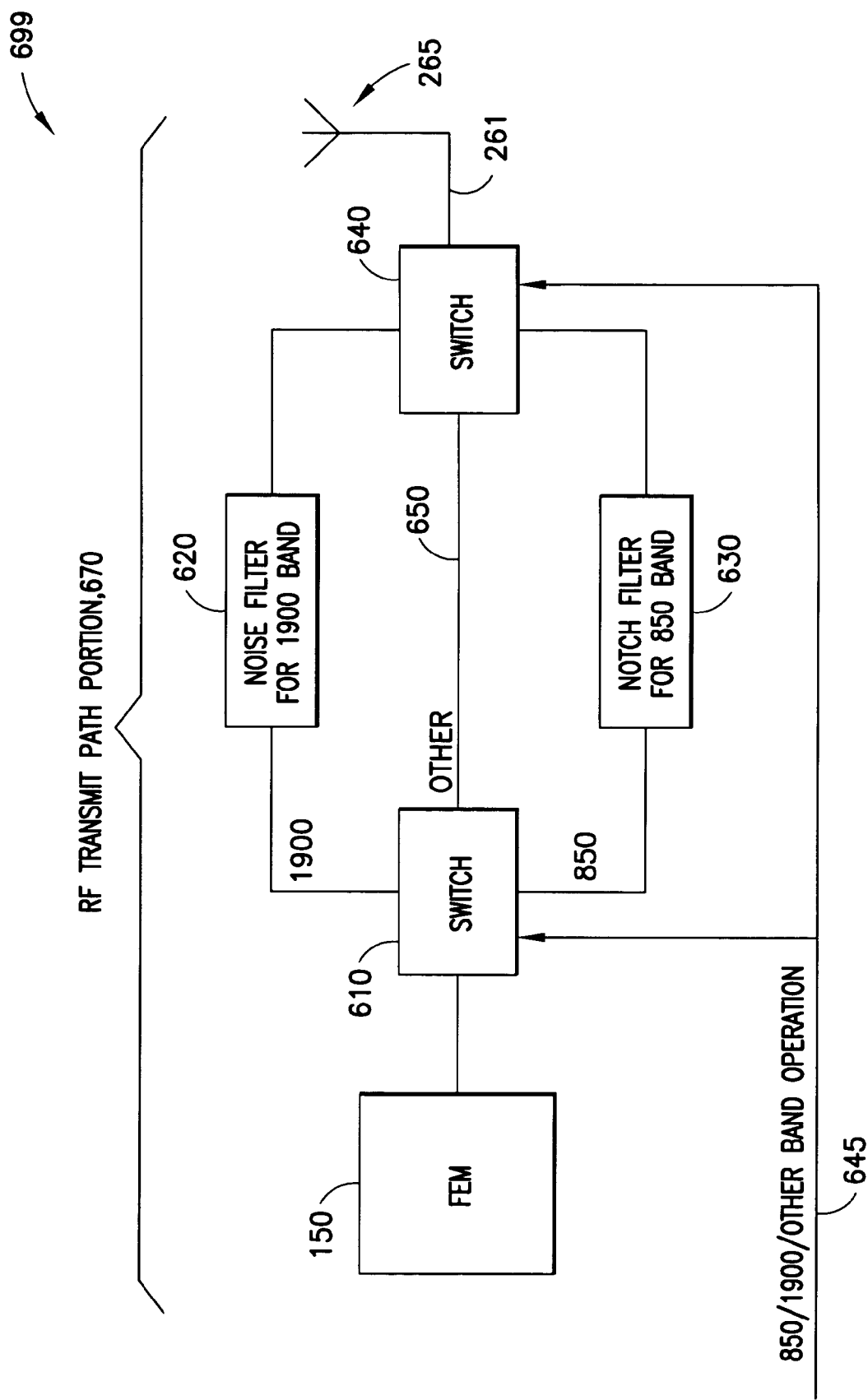

Turning now to FIG. 6, another exemplary possible portion 699, including RF transmit path portion 670, is shown of the mobile station of FIG. 2. The portion 699 comprises the FEM 150, two switches 610, 640, a noise filter 620 for the GSM 1900 frequency band, a notch filter 630 for the GSM 850 frequency band, a filtering control signal 645, the antenna coupling 261, and optionally the antenna 265. FIG. 6 illustrates an alternative proposal for a filter arrangement and is a filter bank approach. The switches 610 and 640 are responsive to the filtering control signal 645 to modify the transmit portion 670 to couple the noise filter 620 or notch filter 630 to the RF transmit path portion 670 or to uncouple the noise filter 620 and notch filter 630 from the RF transmit path portion 670 (e.g., using the unfiltered connection 650). When the GSM transceiver 201 is transmitting using the GSM 850 frequency band, the switches 610 and 640 couple the notch filter 630 to the RF transmit path portion 670. When the GSM transceiver 201 is transmitting using the GSM 1900 frequency band, the switches 610 and 640 couple the noise filter 620 to the RF transmit path portion 670. When the GSM transceiver 201 is transmitting on the GSM 900 or 1800 frequency bands or is receiving (e.g., or the DVB-H receiver 201 is not in a reception mode), the switches 610 and 640 couple the unfiltered connection 650 to the RF transmit path portion 670.

Figure 6A:
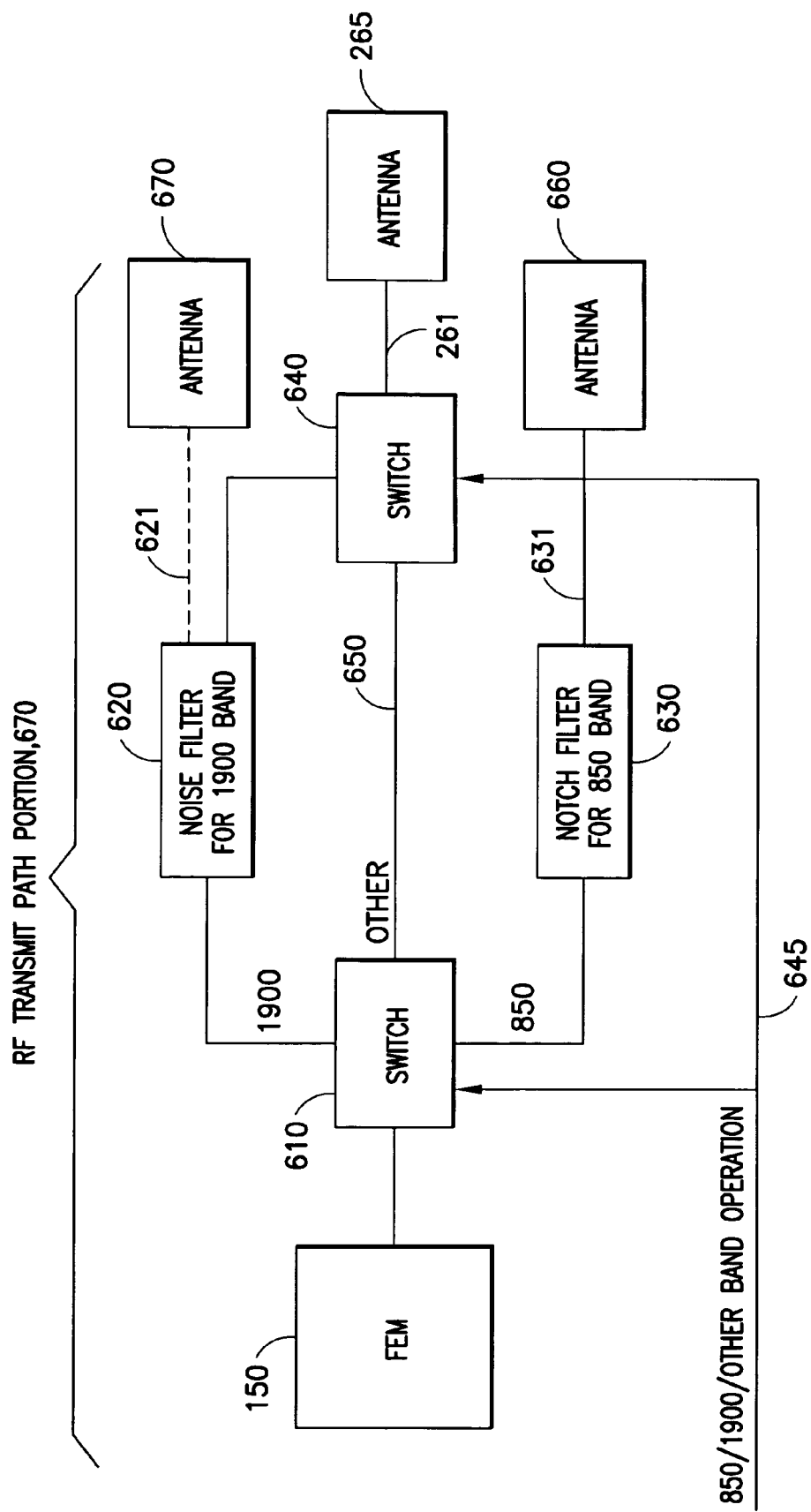

FIG. 6A is an alternative implementation for the radio transmitter presented in FIG. 6. One difference is the second antenna 660, which is connected to notch filter 630. When a filtered signal 631 is transmitted directly from filter 630 via antenna 660, then linearity and harmonic suppression can be maintained. Also transmitted output power can be increased by insertion loss of switch 640. Also a similar kind of extra antenna 670 can be connected to noise filter 620 and the same benefits would occur with the filtered signal 621.

Figure 7:
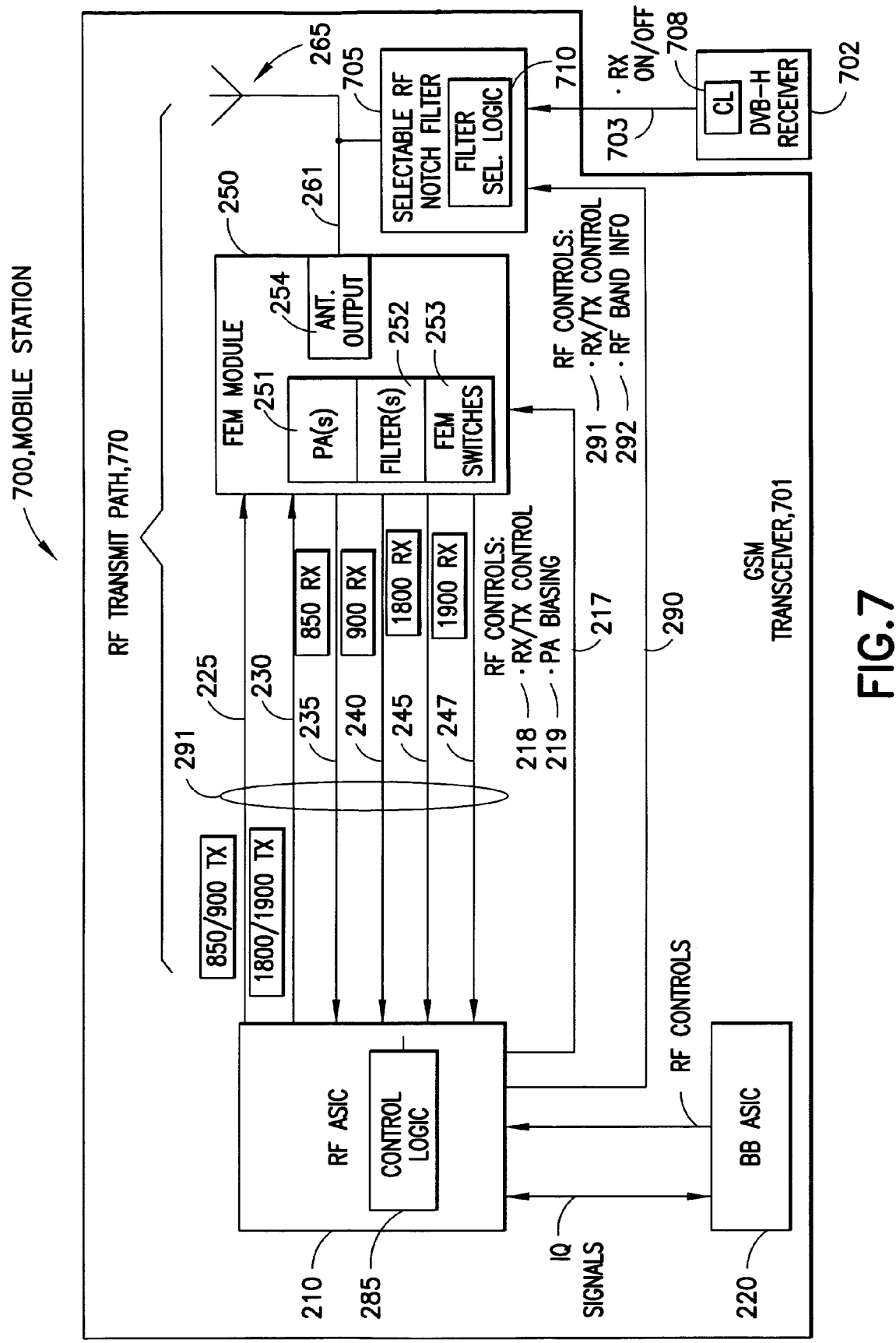
FIG. 7 is a block diagram of a mobile station in accordance with an exemplary embodiment of the present invention and is used to illustrate filtering of GSM transmission signals.

Turning now to FIG. 7, a mobile station 700 is shown in accordance with an exemplary embodiment of the present invention. Mobile station 700 contains many of the components shown in FIG. 2. In this example, however, the GSM transceiver 701 comprises a selectable RF notch filter 705 that also uses the RX on/off signal 703. The DVB-H receiver 702 comprises control logic 708 that generates the RX on/off signal 703. The RX on/off signal 701 is a signal indicating whether the DVB-H receiver 702 is or is not in a reception mode. The selectable RF notch filter 705 comprises filter selection logic 710 that uses the RF controls 291 and the RX on/off signal 703 to select and couple a filter (see FIGS. 3-6) to the antenna coupling 261 or to decouple the filter from the antenna coupling 261. The filter selection logic 710 is control logic for the selectable RF notch filter 705. The RX on/off signal 703 may be enabled by the DVB-H receiver 702 when the DVB-H receiver 702 is in a reception mode, or logic in the selectable RF notch filter 705 can query the DVB-H receiver 702 for the RX on/off signal 703.

In the filtering scheme of FIG. 7, whether the DVB-H receiver 702 is in a reception mode or not (e.g., as indicated by the RX on/off signal 703) is used also for filter selection. The DVB-H receiver 702 typically receives for a few hundred milliseconds and then the DVB-H receiver 702 is in idle mode for a few seconds. When the DVB-H receiver 702 is in an idle mode, extra filtering is not needed.

When the RX on/off signal 703 is also used for controlling filtering of frequency bands, then filtering is generally used only when the DVB-H receiver 702 is in a reception mode (e.g., actively receiving or possibly preparing to receive) and a GSM frequency band is being transmitted by the GSM transceiver 701 at the same time.

Figure 8:
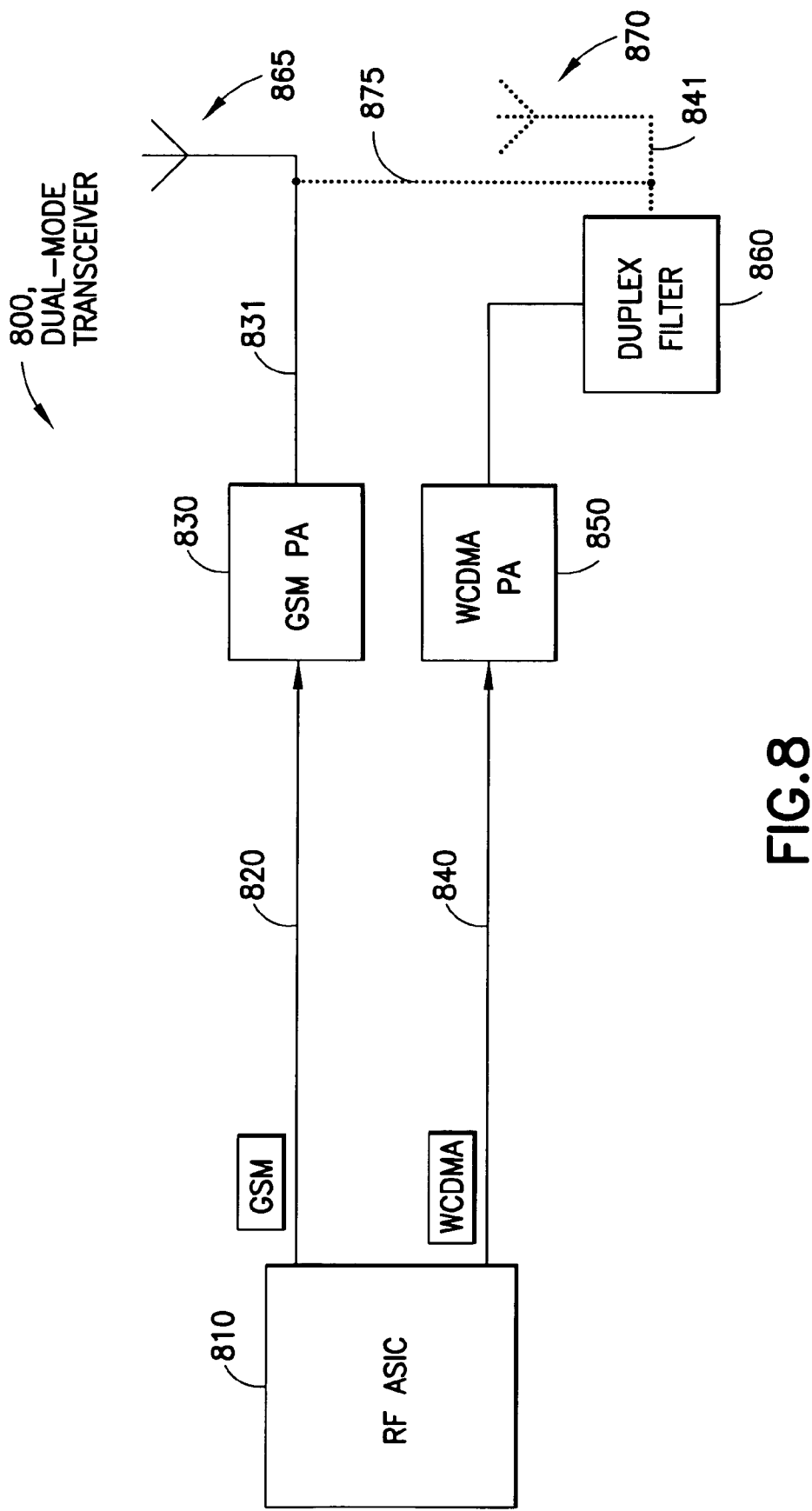
FIG. 8 is a block diagram of a transceiver for a dual-mode mobile station that supports GSM and code-division multiple-access (CDMA)

Alternative techniques for filtering U.S. DVB-H channel noise caused by GSM transmissions can be performed in dual-mode GSM and wide-band CDMA (WCDMA) mobile stations. A typical dual-mode transceiver 800, for use in a dual mode GSM/WDCMA mobile station, is shown in FIG. 8. Transceiver 800 comprises an RF ASIC 810, a GSM bus 820, a GSM PA 830, a WCDMA bus 840, a WCDMA PA 850, a duplex filter 860, antennas 865 and 870, and antenna couplings 831, 841, and 875. GSM signals are transmitted over the GSM bus 820, and WCDMA signals are transmitted over the WCDMA bus 840.

Future U.S. products will include WCDMA operation at both cellular frequency bands 850 and 1900, and at the both of these frequency bands GSM operation will also continue. These future U.S. products, an exemplary transceiver 800 of which is shown in FIG. 8, will be dual-band products with dual-mode operation.

Since WCDMA and GSM are operating at the same frequency, one common antenna (e.g., antenna 865, coupled to the duplex filter 860 using the antenna coupling 875) can be used or separate antennas (e.g., antenna 865 and antenna coupling 831 for GSM and antenna 870 and antenna coupling 841 for WCDMA) for both systems can be used. The dotted lines in FIG. 8 indicate optional arrangements.

FIG. 8 shows only WCDMA duplex filter 860, but in fact for each frequency band 850 and 1900, one duplex filter 860 is needed. Additionally, a duplex filter 860 typically contains two pass-band filters: one for reception and one for transmission.

Figure 9:
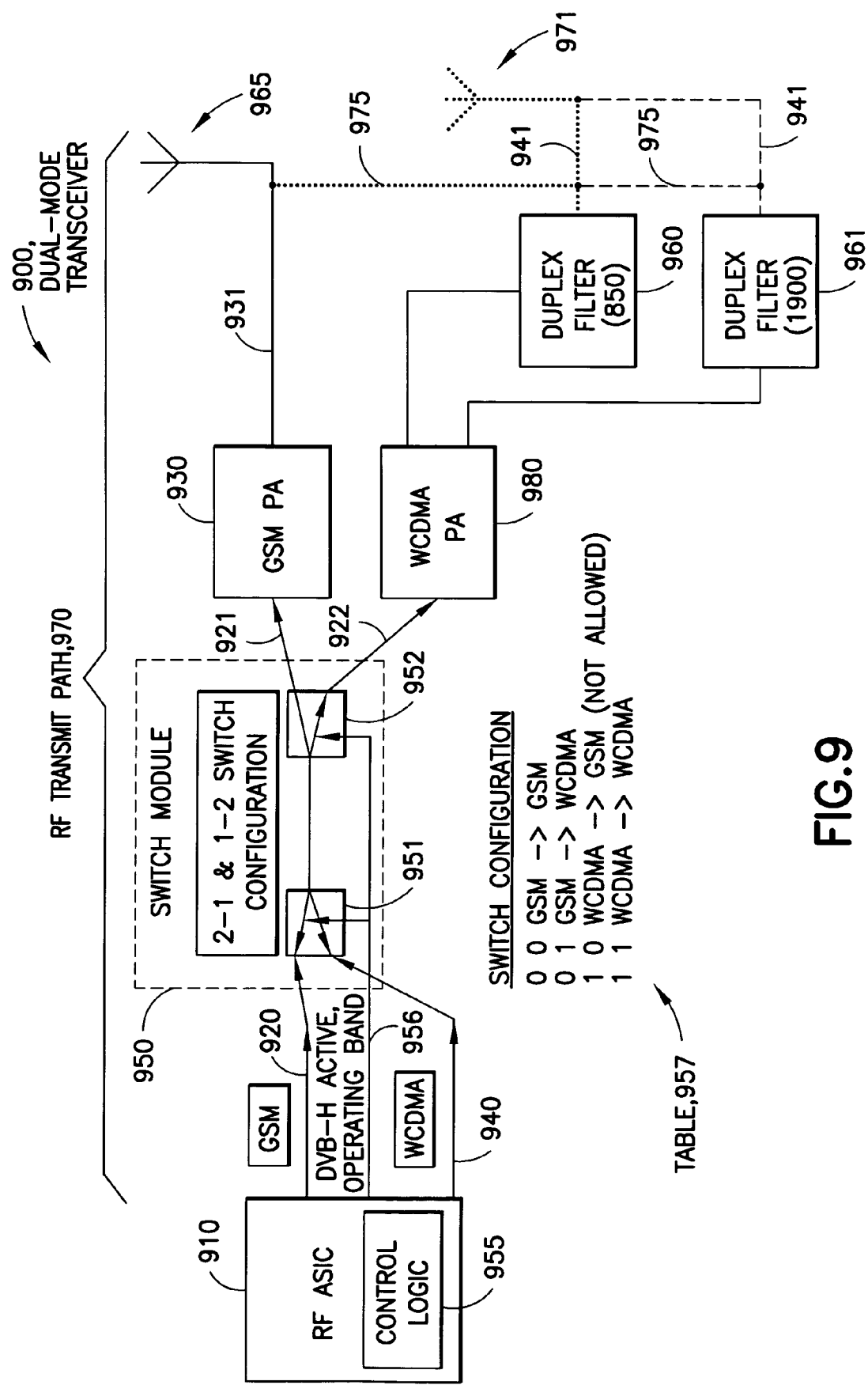
FIG. 9 is a block diagram of a transceiver for a dual-mode mobile station that supports GSM and CDMA, in accordance with an exemplary embodiment of the present invention.

Referring now to FIG. 9, this figure shows a dual-mode transceiver 900 operating in accordance with an exemplary embodiment of the present invention. Transceiver 900 comprises an RF ASIC 910, a GSM bus 920, a GSM PA 930, a WCDMA bus 940, a WCDMA PA 980, two duplex filters 960 and 961, a switch module 950, antennas 965 and 971, and antenna couplings 931, 941, and 975, and two switch outputs 921, 922. The RF ASIC 910 is an RF device that creates and communicates RF signals using one of several frequency bands. Note that the RF ASIC 910 may comprise multiple RF devices (e.g., one RF device could create and communicate RF signals defined by the GSM communication protocol, while another RF device creates and communicates RF signals defined by the WCDMA protocol). When a DVB-H receiver (not shown in FIG. 9) is not coupled to the dual-mode transceiver 900 or is not in a reception mode (e.g., receiving), signals defined by the GSM communication protocol are typically transmitted over the GSM bus 920 and the switch output 921, and signals defined by the WCDMA communication protocol are transmitted over the WCDMA bus 940 and the switch output 922.

As with FIG. 8, since the communication protocols of WCDMA and GSM are operating at the same frequency, one common antenna (e.g., antenna 965, coupled to the duplex filter 960 using the antenna coupling 975) can be used or separate antennas (e.g., antenna 965 and antenna coupling 931 for GSM and antenna 971 and antenna coupling 941 for WCDMA) for each communication protocol can be used. The dotted lines in FIG. 9 indicate optional arrangements for the antennas 965, 971 and antenna couplings 931, 941, and 975. FIG. 9 shows that for each frequency band 850 and 1900, one duplex filter 960 (e.g., the frequency band 850) or 961 (e.g., the frequency band 1900) is typically used. Additionally, a duplex filter 960 or 961 typically contains two pass-band filters: one for reception and one for transmission.

In FIG. 9, the switch module 950 comprises two switches 951 and 952. The control logic 955 uses an input from the DVB-H receiver (not shown in FIG. 9) to determine the control signal 956, which in this example is two bits. The control signal 956 is also determined using the transmitting frequency bands for GSM. The control of the GSM routing to WCDMA transmitter is controlled with operating band information and when DVB-H is active.

The switch module 950 is responsive to states of the control signal 956 and will modify the RF transmit path 970 to couple the duplex filters 960, 961 to the RF transmit path 970 when certain conditions are met. The RF transmit path 970 is modified so that the duplex filters 960, 961 are coupled to the RF transmit path 970 by coupling the GSM bus 920 to the switch output 922, so that the WCDMA PA 980 and the duplex filters 960, 961 (e.g., and possibly the antenna 971) become part of the RF transmit path 970. In the example of FIG. 9 and as shown in table 957, the GSM bus 920 is coupled to the WCDMA PA 980 when the control signal 956 has a state where two bits are a zero and a one. For other versions of the control signal 956, the RF transmit path 970 is modified by the switch module 950 to decouple the duplex filter 960 from the RF transmit path 970 for GSM signals from the RF ASIC 910. For instance, the GSM bus 920 remains coupled to the GSM PA 930 when the control signal 956 has a state where two bits are both zeros. The WCDMA bus 940 remains coupled to the WCDMA PA 980 when the control signal 956 has a state where two bits are both ones. The state of having a first bit being a one and a second bit being a zero for the control signal 956 is not allowed in this example. It should be noted in FIG. 9 that there is only one RF transmit path 970, as both WCDMA and GSM signals will not be transmitted at the same time.

In WCDMA mode (e.g., both bits of the control signal 956 are ones in the example of FIG. 9), the transmission is filtered after the WCDMA PA 980 with a duplex filter 960. Transmission filters (not shown) in the duplex filters 960, 961 will attenuate transmission harmonics and wide band noise. For at least this reason, a GSM transmission can be filtered by the duplex filters 960, 961.

The duplex filters 960, 961 will increase loss after the WCDMA PA 980 and thus lower transmitted output power is delivered to antenna 965 (e.g., or 971). For this reason, it is beneficial that the GSM transmission is filtered only when DVB-H receiver is in a reception state. In FIG. 9, "GSM" means both the 850 and 1900 frequency bands for the GSM communication protocol and "WCDMA" means both the 850 and 1900 frequency bands for the WCDMA communication protocol. Additionally, in FIG. 9, the GSM PA 930 includes both GSM frequency band 850 and 1900 amplifiers and the WCDMA PA 980 includes both WCDMA frequency band 850 and frequency band 1900 amplifiers.

FIGS. 2-7 and 9 have shown examples of how interoperability between receivers and transmitters can be improved in a mobile station. FIGS. 2-7 and 9 use filtering, among other things, to improve interoperability.

Figure 10:
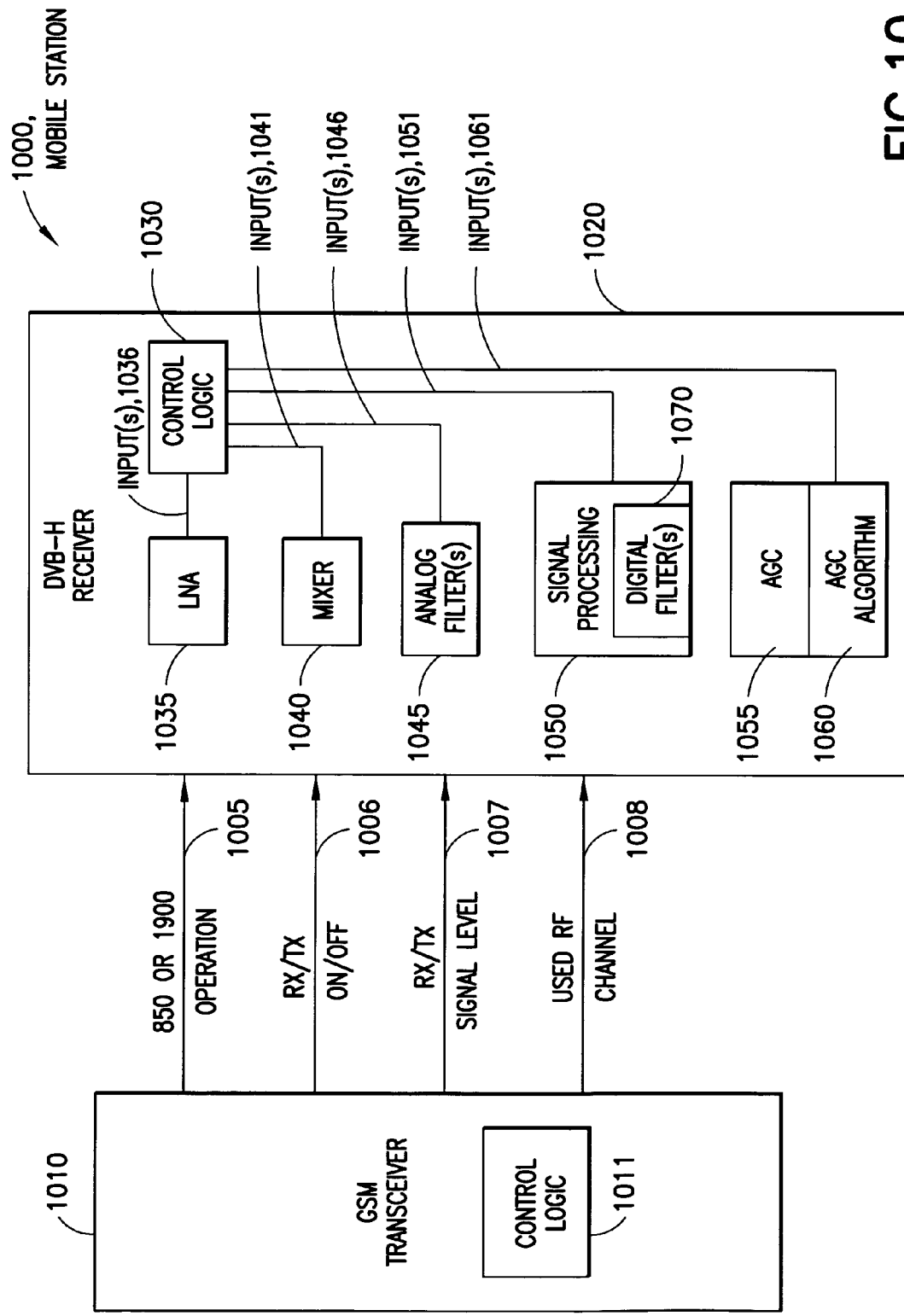
FIG. 10 is a block diagram of a mobile station that improves operability between a GSM transceiver and a DVB-H receiver.
Figure 11:
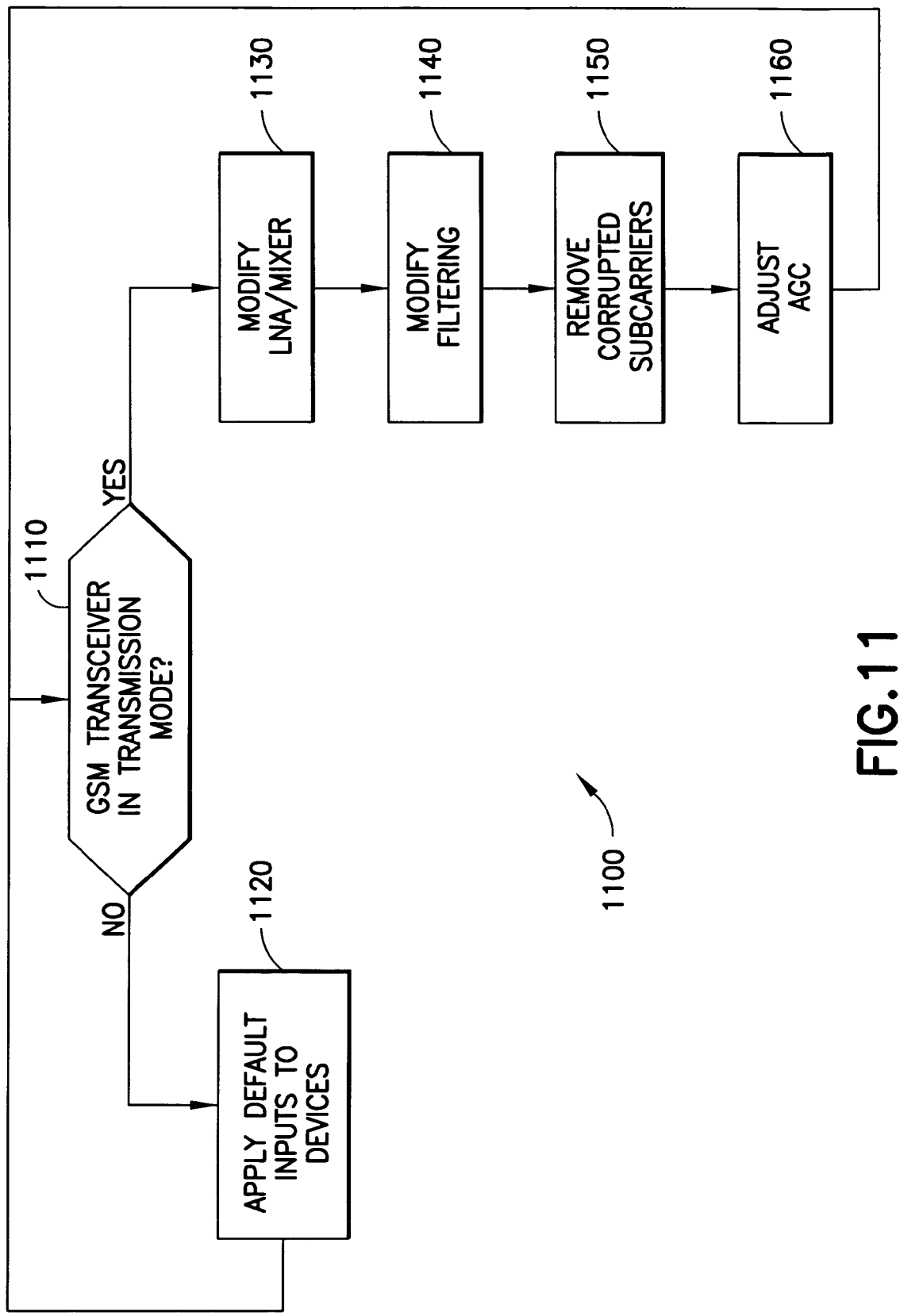
FIG. 11 is a flow chart for improving interoperability between GSM transceivers and DVB-H receivers.

FIGS. 10 and 11 illustrate other exemplary techniques for improving interoperability between receivers and transmitters in a mobile station. In particular, in response to a transmission (e.g., which can include preparations to transmit) the DVB-H receiver is adjusted, preferably by modifying inputs used by devices in the DVB-H receiver.

Turning now to FIG. 10, a mobile station 1000 is shown. Mobile station 1000 comprises a GSM transceiver 1010 coupled to a DVB-H receiver 1020. DVB-H receiver 1020 comprises control logic 1030, an LNA 1035, a mixer 1040, one or more filters 1045, a signal processing module 1050, and an AGC module 1055. The AGC module 1055 comprises an AGC algorithm 1061. The signal processing module 1050 comprises one or more digital filters 1070. The control logic 1030 controls operations of the DVB-H receiver 1020, such as controlling the LNA 1035, mixer 1040, filters 1045, signal processing module 1050, and AGC module 1055 to receive information in the DVB-H frequency band of the DVB-H RF signal 1090. Certain signals are coupled between the GSM transceiver 1010 and the DVB-H receiver 1020. The control logic 1011 of the GSM transceiver 1010 generates these signals. In the example of FIG. 10, the following signals are coupled between the GSM transceiver 1010 and the DVB-H receiver 1020: 850 or 1900 operation 1005; RX/TX on/off 1006; RX/TX signal level 1007; and used RF channel 1008. Note that not all of these signals need to be used and additional signals may be provided, if desired. The control logic is responsive to the signals 1005-1008 and modifies one or more of the value(s) 1036, 1041, 1051, and 1061 in response to one or more of the signals 1005-1008.

The channel numbers of different GSM systems are shown in table below:

| GSM system | Lowest channel number | Highest channel number |
| --- | --- | --- |
| GSM850 | 128 | 251 |
| GSM900 | 975 | 124 |
| GSM1800 | 512 | 885 |
| GSM1900 | 512 | 810 |

From this table, it can be seen that the same channel numbers are used in different GSM systems. Thus operational band information is needed for controlling purposes.

The signal 1007 information can be used for the optimization purposes. When transmission signal levels are known, then the DVB-H receiver can be linearized only to a needed level. This is desirable since a more linear mode consumes more power.

Additionally, some or all of the functionality (e.g., including the devices 1035, 1040, 1045, 1050, and 1055) of the DVB-H receiver 1010 may be performed by processors such as a digital signal processor (DSP), hardware such as very large scale integrated circuits (VLSI), or programmable logic devices (e.g., using read only memories) such as field programmable gate arrays (FPLGA), or some combination of these or any other suitable device. The signals herein may be, for instance, signals that travel on conductive elements, such as traces or wires, or may be one or more messages that are passed between software modules.

Referring now to FIG. 11, with appropriate reference to FIG. 10, a method 1100 is shown for improving interoperability between the GSM transceiver 1010 and the DVB-H receiver 1020 in the mobile station 1000. Method 1100 is typically performed by the control logic 1030.

In step 1110, it is determined if the GSM transceiver 1010 is in transmission mode (e.g., or is not in a reception mode). Adjustment is not needed when the GSM transceiver 1010 is in reception mode (step 1110=No), and default inputs are applied to the devices 1035, 1040, 1045, 1050, and 1060 by using inputs 1041, 1046, 1051, and 1061. Note that the GSM transceiver 1010 may also have an idle mode, and default inputs would also be applied to the devices when the GSM transceiver 1010 is in idle mode.

If the GSM transceiver 110 is operating in transmission mode (step 1110=Yes), then the method continues in step 1130. Note that one or all of steps 1130 through 1160 maybe performed.

In step 1103, the LNA 1035 and mixer 1040 are adjusted using inputs 1036 and 1041, respectively. It should be noted that the LNA 1035 and the mixer 1040 may be separately adjusted, if desired. The inputs for the LNA 1035 and mixer 1040 are modified for more linear mode with higher noise figure when harmonics are transmitted in order to avoid compression. This way, the DVB-H receiver 1020 can better tolerate interference signals.

Increasing the biasing current (e.g., as input 1036) of the LNA 1035 can force the LNA 1035 to a more linear mode. The same applies also for mixer 1040 (e.g., increasing the biasing current as input 1041 to the mixer 1040 can force the mixer 1040 to a more linear mode). In normal operation mode (step 1120), the LNA 1035 and mixer 1040 are biased (e.g., using inputs 1036 and 1041) to a low biasing mode in order to achieve a long operating time for the mobile station 1000. The high biasing mode (step 1130) is typically only used when high interference signal of a GSM transmission is present. This high biasing mode consumes more power and thus reduces operating time of the mobile station 1000.

Note that step 1130 will typically change to high biasing mode when the GSM transceiver 1010 is transmitting on either of the 850 or 1900 frequency bands (e.g., as indicated by the RX/TX On/off signal 1006).

In step 1140, DVB-H RF filtering, as performed by filter(s) 1045, is modified based on GSM transmission frequency information. The GSM transmission frequency information can be determined using the signal used RF channel 1008, which indicates whether the 850 or 1900 frequency band was used, and the 850 or 1900 operation signal 1005, which indicates whether one of the frequency bands 850 or 1900 is being used to transmit. Step 1140 is typically used when GSM harmonics will fall near the frequency band used by the DVB-H RF signal 1090 but the actual harmonic is outside of the frequency band used by the DVB-H RF signal 1090 (e.g., an out-of-band blocker). Step 1140 is used, for instance, for the 1900 frequency band, which generates harmonics outside of the frequency band used by the DVB-H RF signal 1090.

The filtering can be changed at the base band filtering (performed, e.g., by filters 1045) and in filtering performed by the signal processing module 1050. Typically, the signal processing module 1050 is implemented at least partially by a DSP. The base band filtering can be modified by reducing the signal bandwidth. The actual modification is the modification of a corner frequency of a low pass filter 1045 or modification of an order of the filter 1045 or both. These modifications may be performed through inputs 1046, which are typically values associated with the filter 1045. The modification of order may improve performance of the DVB-H receiver 1020 when the signal interference caused by the GSM transmission is near the DVB-H frequency band. Analog domain filtering is done to protect an analog-to-digital converter (not shown) in the DVB-H receiver 1020 from not saturating due to strong interference signals.

The filtering (e.g., digital filter 1070) performed by the signal processing module 1050 can be changed by altering the filtering coefficient (e.g., an input 1051) of a finite impulse response (FIR) filter implemented by the signal processing module 1050. Filtering performed by the signal processing module 1050 may also be used to filter sub-carriers of the DVB-H RF signal 1090 (see step 1150 below). The filtering performed by the signal processing module 1050 also corrects non-idealities caused by analog filtering. The non-idealities comprise amplitude and phase corrections.

In step 1150, corrupted sub-carriers are removed. The DVB-H signal is an orthogonal frequency division multiplexed (OFDM) signal which includes a number of sub-carriers (in 2 k mode 1705, 4 k mode 3409 and 8 k mode 6817 sub-carriers). When GSM channel number (e.g., through used RF channel signal 1008) is submitted to the DVB-H receiver 1020, the signal processing module 1050 (e.g., implemented using a DSP) can remove corrupted sub-carriers, because GSM harmonics will completely destroy only selected sub-carriers. Step 1150 is typically performed when transmission in a GSM frequency band, such as the 850 frequency band, generates harmonics inside of the frequency band used by the DVB-H RF signal 1090 (e.g., co-channel interference or spurious interference).

The corrupted sub-carriers can be removed by ignoring the sub-carrier information. This is the easiest technique to implement removal of sub-carriers. An alternative technique is to ignore sub-carrier information from sub-carriers that are expected to be corrupted and to use previous information (e.g., stored information) from these sub-carriers. This stored information is added to new information from other carriers and this mixed combined signal is filtered and further processed.

In step 1150, the control logic 1030 modifies an input 1151 to the signal processing module 1050, and the signal processing module 1050 is responsive to the modified input 1151 to filter corrupted sub-carriers. For instance, the input 1151 could be a default message (e.g., "perform normal processing") when the used RF channel signal 1008 indicates that the 850 frequency band is not being used for transmission, and the input 1151 could be a different message (e.g., "remove sub-carriers") when the used RF channel signal 1008 indicates that the 850 frequency band is being used for transmission.

The impact of the sub-carrier removal is that raw bit-error rate will increase but if the bit-per-symbol interleaving is done over several sub-carriers and over multiple symbol times, then this sub-carrier information removal may be corrected. The correction is based on signal interleaving and information coding. The actual performance reduction, which can be seen by sub-carrier removal, is a function of the performance of interleaving and coding and the signal bandwidth of DVB-H RF signal 1090.

In step 1160, the AGC module 1055 can be altered, using inputs 1061 and typically the AGC algorithm 1060, when harmonics are present, such as when the 850 frequency band is being used to transmit. In this manner, the recovery time from the high power spurious signals can be improved. For instance, an AGC value which determines actual amplification of the variable gain amplifier (not shown) before spurious signals are present (e.g., as determined by the 850 or 1900 operation signal 1005 and the used RF channel signal 1008) can be used until after the spurious signals disappear. For instance, the control logic 1030 could cause an input 1061 to be modified that in turn causes the AGC algorithm 1060 to "freeze" its value until the input 1061 is again modified. Another possibility is that AGC bandwidth can be altered (e.g., such as by modifying values using inputs 1061 of a filter used by the AGC 1055) when narrow-bandwidth spurious signals are expected to appear.

Figure 12:
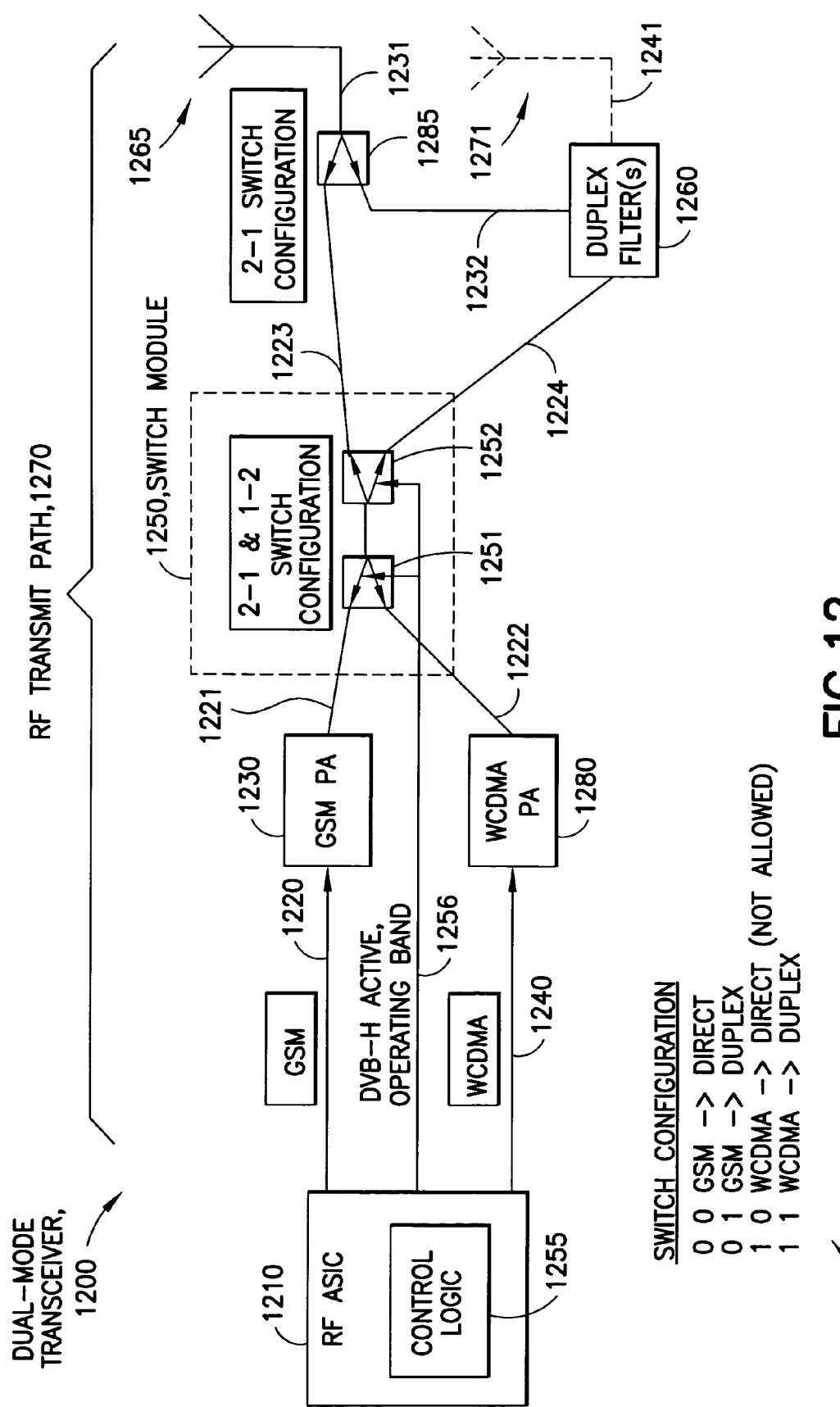
FIG. 12 is a block diagram of a transceiver for a dual-mode mobile station that supports GSM and CDMA, in accordance with an exemplary embodiment of the present invention.

Referring now to FIG. 12, this figure shows a dual-mode transceiver 1200 operating in accordance with an exemplary embodiment of the present invention. Transceiver 1200 comprises an RF ASIC 1210, a GSM bus 1220, a GSM PA 1230, a WCDMA bus 1240, a WCDMA PA 1280, duplex filter(s) 1260, a switch module 1250, antennas 1265 and 1271, antenna couplings 1231 and 1241, switch inputs 1221 and 1222, switch couplings 1223 and 1224, a control signal 1256, a switch 1285, and duplexer coupling 1232. The switch module 1250 comprises switches 1251, 1252. Switch module 1250 (e.g., switches 1251, 1252) and 1285 are responsive to the control signal 1256. The RF ASIC 1210 comprises control logic 1255. The RF ASIC 1210 is an RF device that creates and communicates RF signals using one of several frequency bands. Note that the RF ASIC 1210 may comprise multiple RF devices (e.g., one RF device could create and communicate RF signals defined by the GSM communication protocol, while another RF device creates and communicates RF signals defined by the WCDMA protocol). When a DVB-H receiver (not shown in FIG. 12) is not coupled to the dual-mode transceiver 1200 or is not in a reception mode (e.g., receiving), signals defined by the GSM communication protocol are typically transmitted over the GSM bus 1220, through GSM PA 1230 and the switch input 1221, through the switches 1251 and 1252, through the switch coupling 1223, through the switch 1285 and antenna coupling 1231, and to the antenna 1265. Similarly, signals defined by the WCDMA communication protocol are transmitted over the WCDMA bus 1240, through the WCDMA PA 1280 and the switch input 1222, through the switches 1251 and 1252, through the switch coupling 1224 and duplex filter(s) 1260, and through the duplexer coupling 1232 and the switch 1285 to the antenna coupling 1231 and the antenna 1265.

Since the communication protocols of WCDMA and GSM are operating at about the same frequency, one common antenna (e.g., antenna 1265, coupled to the switch 1285 using the antenna coupling 1231) can be used or separate antennas (e.g., antenna 1265 and antenna coupling 1231 for GSM and antenna 1271 and antenna coupling 1241 for WCDMA) for each communication protocol can be used. For instance, in the WCDMA Third Generation Partnership Project (3GPP) Standard 25.101, version 6.7.0 (March 2005), the following UMTS Terrestrial Radio Access (UTRA) Frequency Division Duplex (FDD), where UMTS stands for "Universal Mobile Telecommunications System," the following frequency bands can be used for WCDMA:

| Operating Band | Uplink Frequencies | Downlink Frequencies |
| --- | --- | --- |
| I | 1920-1980 MHz | 2110-2170 MHz |
| II | 1850-1910 MHz | 1930-1990 MHz |
| III | 1710-1785 MHz | 1805-1880 MHz |

-continued

| Operating Band | Uplink Frequencies | Downlink Frequencies |
|---|---|---|
| IV | 1710-1755 MHz | 2110-2155 MHz |
| V | 824-849 MHz | 869-894 MHz |
| VI | 830-840 MHz | 875-885 MHz |

Figure 13:
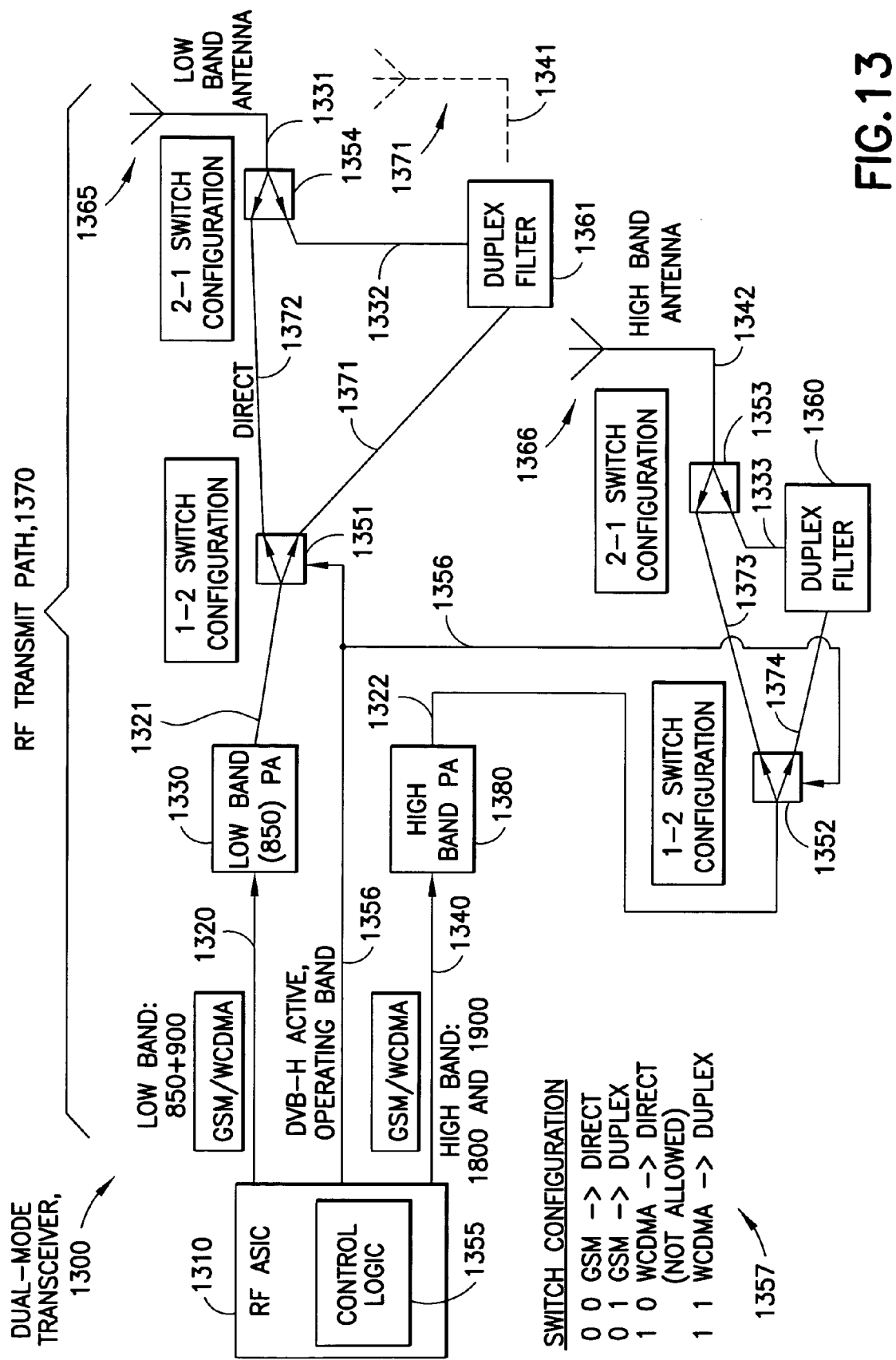
FIG. 13 is a block diagram of a transceiver for a dual-mode mobile station that supports GSM and CDMA, in accordance with an exemplary embodiment of the present invention.

Thus, the WCDMA Operating Band II above, may be used in FIGS. 12 and 13 (e.g., and in other figures above), as can other operating bands such as Operating Bands I and III-VI. In the examples given above, the Operating Bands I and II could be considered the "WCDMA1900" frequency band, the Operating Bands III and IV could be considered the "WCDMA1800" frequency band, the Operating Band V could be considered the "WCDMA850" frequency band, and the Operating Band VI could be considered the "WCDMA900" frequency band. The dotted lines in FIG. 12 indicate optional arrangements for the antennas 1265, 1271 and antenna couplings 1231, 1241. The duplex filter(s) 1260 has typically (e.g., as described in reference to FIG. 9 above and also to FIG. 13 below) two duplex filters, one for low and high frequency bands (e.g., 850 and 1900). Additionally, a duplex filter(s) 1260 typically contains two pass-band filters: one for reception and one for transmission.

In FIG. 12, the control logic 1255 uses an input from the DVB-H receiver (not shown in FIG. 12) to determine the control signal 1256, which in this example is two bits. The control signal 1256 is also determined using the transmitting frequency bands for GSM. The control of the GSM routing to WCDMA transmitter (e.g., duplex filter(s) 1260) is determined using GSM operating band information and DVB-H activity (e.g., reception is occurring on a DVB-H frequency band). In the case of U.S. operating frequency bands, both the low frequency band (e.g., GSM850) and high frequency band (e.g., GSM1900) for GSM will be routed to an appropriate one of the duplex filter(s) 1260. For instance, the high frequency band (e.g., GSM1900) would be routed to a filter in the duplex filter(s) 1260 suitable for filtering the high frequency band.

The switch module 1250 and the switch 1285 are responsive to states of the control signal 1256 and will modify the RF transmit path 1270 to couple the duplex filter(s) 1260 to the RF transmit path 1270 when certain conditions are met. The RF transmit path 1270 is any path through which RF signals may be routed for transmission. For instance, when the RF ASIC 1210 is transmitting using the GSM 850 frequency band and the DVB-H receiver is not receiving, the RF transmit path 1270 comprises the GSM bus 1220, the GSM PA 1230, the switch input 1221, the switch module 1250, the switch coupling 1223, the switch 1285, the antenna coupling 1231 and the antenna 1265. The RF transmit path 1270 is modified so that the duplex filter(s) 1260 are coupled to the RF transmit path 1270 by coupling the GSM bus 1220 to the switch coupling 1224, so that the duplex filter(s) 1260 becomes part of the RF transmit path 1270 to the antenna 1265 or to the antenna 1271. Note that if antenna 1271 is used, the switch 1285 need not be necessary.

In the example of FIG. 12 and as shown in table 1257, the GSM bus 1220 is coupled to the duplex filter(s) 1260 when the control signal 1256 has a state where two bits are a zero and a one. For other versions of the control signal 1256, the RF transmit path 1270 is modified by the switch module 1250 and the switch 1285 to decouple the duplex filter 1260 from the RF transmit path 1270 for GSM signals from the RF ASIC 1210. For instance, the GSM bus 1220 is coupled through a first path having the switch coupling 1223 and the antenna coupling 1231 when the control signal 1256 has a state where two bits are both zeros. The WCDMA bus 1240 is coupled through a second path having the duplex filter(s) 1260 and the antenna coupling 1231 when the control signal 1256 has a state where two bits are both ones. The state of having a first bit being a one and a second bit being a zero for the control signal 1256 is not allowed in this example. It should be noted in FIG. 12 that there is only one RF transmit path 1270, as both WCDMA and GSM signals will typically not be transmitted at the same time.

In WCDMA mode (e.g., both bits of the control signal 1256 are ones in the example of FIG. 12), the transmission is filtered after the WCDMA PA 1280 with a duplex filter(s) 1260. Transmission filters (not shown) in the duplex filter(s) 1260 will attenuate transmission harmonics and wide band noise. For at least this reason, a GSM transmission can be filtered by the duplex filter(s) 1260.

The duplex filter(s) 1260, however, will typically increase loss after the GSM PA 1230 and thus lower transmitted output power is delivered to antenna 1265 (e.g., or 1271). For this reason, it is beneficial that the GSM transmission is filtered only when the DVB-H receiver is in a reception state. In FIG. 12, "GSM" means, e.g. for the U.S., both the 850 and 1900 frequency bands for the GSM communication protocol and "WCDMA" means one or more of the Operating Bands in the table shown above for the WCDMA communication protocol. Note that E.U. frequency bands may also be used. Additionally, in FIG. 12, the GSM PA 1230 includes both GSM frequency band 850 and 1900 amplifiers and the WCDMA PA 1280 includes both WCDMA low (e.g., Operating Band V and VI) and high (e.g., Operating Band I-IV) frequency band power amplifiers. It should be noted that the switch 1252 could have three outputs, a first output for switch coupling 1223, a second output for a coupling to a duplex filter 1260 for the a low frequency band, and a third output for a high frequency band. In this example, there would be three possible paths through which the RF transmit path 1270 may be routed after the switch 1252.

Referring now to FIG. 13, this figure shows a dual-mode transceiver 1300 operating in accordance with an exemplary embodiment of the present invention. Transceiver 1300 comprises an RF ASIC 1310, a low band bus 1320, a low band PA 1330, a high band bus 1340, a high band PA 1380, duplex filters 1360, 1361, switches 1351-1354, antennas 1365, 1366, and 1371, antenna couplings 1331, 1341, and 1342, switch couplings 1321, 1322, and 1371-1374, a control signal 1356, and duplexer couplings 1332, 1333. Switches 1351-1354 are responsive to the control signal 1356. The RF ASIC 1310 comprises control logic 1355. The RF ASIC 1310 is an RF device that creates and communicates RF signals using one of several frequency bands. Note that the RF ASIC 1310 may comprise multiple RF devices. The low band bus 1320 carries either the lower GSM frequency band (e.g., GSM850) or the lower WCDMA frequency band (e.g., Operating Band V or VI, the latter shown as "900" in FIG. 13), while the high band bus 1340 carries either the higher GSM frequency band (e.g., GSM1900) or the higher WCDMA frequency band (e.g., Operating Band I-IV).

When a DVB-H receiver (not shown in FIG. 13) is not coupled to the dual-mode transceiver 1300 or is not in a reception mode (e.g., receiving), signals defined by the GSM communication protocol and in a low frequency band are typically transmitted over the low band bus 1320, through low band PA 1330 and the switch coupling 1321, through the switch 1351 and the switch coupling 1372, through the switch 1354, through the antenna coupling 1331, and to the antenna

1365. Additionally, signals defined by the WCDMA communication protocol and in the low frequency band are typically transmitted over the low band bus 1320, through low band PA 1330 and the switch coupling 1321, through the switch 1351 and the switch coupling 1371, through the duplex filter 1361, through the duplexer coupling 1332 and switch 1354 and to the antenna coupling 1331 and antenna 1365. Additionally, the antenna coupling 1341 and the antenna 1371 could be used instead of the duplexer coupling 1332, the switch 1354, and the antenna 1365.

Also when the DVB-H receiver is not coupled to the dual-mode transceiver 1300 or is not in a reception mode, signals defined by the GSM communication protocol and in a high frequency band are typically transmitted over the high band bus 1340, through high band PA 1380 and the switch coupling 1322, through the switch 1352 and the switch coupling 1373, through the switch 1353, through the antenna coupling 1342, and to the antenna 1366. Additionally, signals defined by the WCDMA communication protocol and in the high frequency band are typically transmitted over the high band bus 1340, through high band PA 1380 and the switch coupling 1322, through the switch 1352 and the switch coupling 1374, through the duplex filter 1360, through the duplexer coupling 1333 and switch 1353 and to the antenna coupling 1342 and antenna 1366. Each of the duplex filters 1360 and 1361 typically contains two pass-band filters: one for reception and one for transmission.

In FIG. 13, the control logic 1355 uses an input from the DVB-H receiver to determine the control signal 1356, which in this example is two bits. The control signal 1356 is also determined using the transmitting frequency bands for GSM. The control of the GSM routing to WCDMA transmitter (e.g., duplex filter(s) 1360) uses GSM operating band information and DVB-H activity (e.g., reception is occurring on a DVB-H frequency band).

The switches 1351-1354 are responsive to states of the control signal 1356 and will modify the RF transmit path 1370 to couple the duplex filters 1360, 1361 to the RF transmit path 1370 when certain conditions are met. The RF transmit path 1370 is any path through which RF signals may be routed for transmission. For instance, when the RF ASIC 1310 is transmitting using the GSM 850 frequency band and the DVB-H receiver is not receiving, the RF transmit path 1370 comprises the low band bus 1320, the low band PA 1330, the switch coupling 1321, the switch 1351, a first path having the switch coupling 1372 and the switch 1354, the antenna coupling 1331 and the antenna 1365. As another example, when the RF ASIC 1310 is transmitting using the GSM 1900 frequency band and the DVB-H receiver is not receiving, the RF transmit path 1370 comprises the high band bus 1340, the high band PA 1330, the switch coupling 1322, the switch 1352, a first path having the switch coupling 1373 and the switch 1353, the antenna coupling 1342 and the antenna 1366. In an exemplary embodiment, the RF transmit path 1370 is modified so that a second path having the duplex filter 1361 is coupled to the RF transmit path 1370 by coupling the low band bus 1320 to the switch coupling 1371 (e.g., as part of the second path), so that the duplex filter 1361 becomes part of the RF transmit path 1370 to the antenna 1365. Note that if antenna 1371 is used, the switch 1354 and duplexer coupling 1332 need not be necessary. In another exemplary embodiment, the RF transmit path 1370 is modified so that a second path having the duplex filter 1360 is coupled to the RF transmit path 1370 by coupling the high band bus 1340 to the switch coupling 1374 (e.g., as part of the second path), so that the duplex filter 1360 becomes part of the RF transmit path 1370 to the antenna 1366.

In the example of FIG. 13 and as shown in table 1357, the low band bus 1320 is coupled to the duplex filter 1361 and the high band bus 1340 is coupled to the duplex filter 1360 when the control signal 1356 has a state where two bits are a zero and a one. For other versions of the control signal 1356, the RF transmit path 1370 is modified by the switches 1351-1354 to decouple the duplex filters 1360 and 1361 from the RF transmit path 1370 for GSM signals from the RF ASIC 1310. For instance, GSM signals on the low band bus 1320 are coupled through the switch coupling 1372 to the antenna coupling 1331 and GSM signals on the high band bus 1340 are coupled through switch coupling 1373 to the antenna coupling 1342 when the control signal 1356 has a state where two bits are both zeros. WCDMA signals on the low band bus 1320 are coupled through the duplex filter 1361 to the antenna coupling 1331 and WCDMA signals on the high band bus 1340 are coupled through the duplex filter 1360 to the antenna coupling when the control signal 1356 has a state where two bits are both ones. The state of having a first bit being a one and a second bit being a zero for the control signal 1356 is not allowed in this example.

It should be noted in FIG. 13 that there is only one RF transmit path 1370, as both WCDMA and GSM signals will not be transmitted at the same time. Additionally, typically only one low or high frequency band for a communication protocol will be transmitted at one time. For instance, the low (850) GSM frequency band would be used for transmission and the high (1900) GSM frequency band would not be used for transmission. In the unlikely event that two frequency bands from the same (e.g., or different) communication protocol would be transmitted at the same time, then there could be two RF transmit paths: one from the low band bus 1320 to the antenna 1365 (e.g., or antenna 1371) and one from the high band bus 1340 to the antenna 1366.

Exemplary embodiments of the present invention have been described thus far in terms of specific examples of frequency bands and the like. However, it should be kept in mind that these teachings can be applied to other frequency bands, such as the frequency bands of 470-702 MHz that are allocated in the E.U. for DVB-H broadcasts, and to other the cellular transmission bands such as those produced by TDMA and/or CDMA cellular systems.

Also, while the above disclosure of the presently preferred embodiments has concentrated on the use of the DVB-H and GSM systems, those skilled in the art should realize that these should not be read as limitations on the practice of this invention, and that other types of communications systems using the same or different frequency bands may also benefit from the use of this invention.

It should be noted that embodiments of the present invention might be implemented on a signal bearing medium comprising a program of machine-readable instructions. The machine-readable instructions are executable by an apparatus to perform operations of one or more steps involved with the present invention.

Furthermore, filtering of a GSM signal is shown occurring at the antenna coupling 261, but other locations are possible. For instance, filtering could occur before the PA 251 of FIGS. 2 and 7, although filtering before the PA 251 may be less beneficial than filtering after the PA 251.

Additionally, the techniques presented above may be used for other frequency bands, such as the frequency bands specified by the CDMAOne and CDMA2000 standards. Broadly, any frequency band that can cause problems with DVB-H frequency bands may be filtered (e.g., FIGS. 2-10), inputs of devices in a DVB-H receiver modified (e.g., FIGS. 10 and 11), or both.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

Furthermore, some of the features of the preferred embodiments of this invention could be used to advantage without the corresponding use of other features. As such, the foregoing description should be considered as merely illustrative of the principles of the present invention, and not in limitation thereof.

What is claimed is:

1. A device comprising:
a receiver configured to connect to a first antenna, the receiver comprising first control logic configured to generate a notification of the receiver being able to receive a reception frequency band,
a transmitter configured to connect to at least one second antenna and to the receiver, the transmitter communicating radio frequency signals in a selected one of at least one transmission frequency bands over a radio frequency transmit path to the at least one second antenna, the transmitter comprising:
second control logic;
at least one filter; and
at least one switch coupled to the radio frequency transmit path, the at least one filter, and the second control logic, the at least one switch configured to modify the radio frequency transmit path to couple a given one of the at least one filters or to decouple the given filter from the radio frequency transmit path,
wherein the second control logic is responsive to the notification to cause the at least one switch to modify the radio frequency transmit path to couple the given filter to the radio frequency transmit path,
where the modified radio frequency transmit path is selected to reduce interference between the transmission frequency band using the modified radio frequency transmit path and the reception frequency band.

2. The device of claim 1, further comprising a display device coupled to the receiver and configured to display at least information received from the receiver.

3. The device of claim 1, wherein:
the second control logic is responsive to the notification to generate at least one control signal; and
the at least one switch is coupled to the at least one control signal and is responsive to the at least one control signal to modify the radio frequency transmit path to couple the given filter or to decouple the given filter from the radio frequency transmit path.

4. The device of claim 3, wherein:
the at least one switch comprises a first switch, the first switch coupled to an antenna coupling in the radio frequency transmit path and intermediate the antenna coupling and the at least one filter, the first switch responsive to one of the at least one control signals to couple the at least one filter or to decouple the at least one filter from the antenna coupling.

5. The device of claim 4, wherein:
the at least one control signal comprises first and second control signals;
the at least one filter comprises two filters;
the at least one switch comprises a second switch coupled to and intermediate the first switch and the two filters, the second switch responsive to the second control signal to couple one of the two filters to an output of the second switch; and
the first switch is responsive to the first control signal to couple the output of the second switch or to decouple the output of the second switch from the antenna coupling.

6. The device of claim 5, wherein:
the at least one transmission frequency band comprises first and second transmission frequency bands;
the two filters comprise first and second filters, the first filter corresponding to the first transmission frequency band and the second filter corresponding to the second transmission frequency band;
the second control logic is responsive to the transmitter being in a transmission mode to cause, by using the first control signal, the first switch to couple the output of the second switch to the antenna coupling; and
the control logic is responsive to which of the first and second transmission frequency bands is to be used for transmission to cause, by using the second control signal, the second switch to couple the first filter to the output of the second switch when the first transmission frequency band is to be used for transmission and to couple the second filter to the output of the second switch when the second transmission frequency band is to be used for transmission.

7. The device of claim 1, wherein:
the at least one transmission frequency band comprises first and second transmission frequency bands;
the at least one filter comprises first and second filters, the first filter corresponding to the first transmission frequency band and the second filter corresponding to the second transmission frequency band; and
the second control logic is responsive to which of the first and second transmission frequency bands is to be used for transmission to cause the at least one switch to couple the first filter to the radio frequency transmit path when the first transmission frequency band is to be used for transmission and to couple the second filter to the radio frequency transmit path when the second transmission frequency band is to be used for transmission.

8. The device of claim 7, wherein the at least one switch comprises a single switch, the single switch comprising three positions and an output, a first position coupling the first filter to the output, a second position coupling the second filter to the output, and a third position coupling a not connected terminal to the output.

9. The device of claim 7, wherein:
the second control logic is configured to generate first and second control signals;
the at least one switch comprises first and second switches;
the first switch is coupled to the first filter and is responsive to the first control signal to couple the first filter to the radio frequency transmit path; and
the second switch is coupled to the second filter and is responsive to the second control signal to couple the second filter to the radio frequency transmit path.

10. The device of claim 7, wherein:
the transmitter comprises a power amplifier;
the at least one switch comprises first and second switches, each of the first and second switches having a single terminal and first, second, and third terminals;
the single terminal of the first switch is coupled to the power amplifier;

the first terminal of the first switch is coupled to an input of the first filter, and the output of the first filter is coupled to the first terminal of the second switch;

the second terminal of the first switch is coupled to the second terminal of the second switch;

the third terminal of the first switch is coupled to an input of the second filter, and an output of the second filter is coupled to the third terminal of the second switch; and the single terminal of the second switch is coupled to the at least one second antenna.

11. The device of claim 7, wherein:

the at least one second antenna comprises two given antennas;

the transmitter comprises a power amplifier;

the at least one switch comprises first and second switches, the first switch having a single terminal and first, second, and third terminals, the second switch having a single terminal and first and second terminals;

the single terminal of the first switch is coupled to the power amplifier;

the first terminal of the first switch is coupled to an input of the first filter, and the output of the first filter is coupled to the first terminal of the second switch;

the second terminal of the first switch is coupled to the second terminal of the second switch;

the third terminal of the first switch is coupled to an input of the second filter, and an output of the second filter is coupled to one of the given antennas; and the single terminal of the second switch is coupled to the other of the given antennas.

12. The device of claim 7, wherein:

the at least one second antenna comprises three given antennas;

the transmitter comprises a power amplifier;

the at least one switch comprises a given switch having a single terminal and first, second, and third terminals;

the single terminal of the given switch is coupled to the power amplifier;

the first terminal of the given switch is coupled to an input of the first filter, and the output of the first filter is coupled to a first of the given antennas;

the second terminal of the given switch is coupled to a second of the given antennas; and the third terminal of the first switch is coupled to an input of the second filter, and an output of the second filter is coupled to a third of the given antennas.

13. The device of claim 1, wherein:

the transmitter further comprises at least one radio frequency device configured to create the radio frequency signals in the selected one of the at least one transmission frequency bands; and the radio frequency transmit path comprises a path from the at least one radio frequency device to the at least one second antenna.

14. The device of claim 13, wherein the second control logic is part of the at least one switch.

15. The device of claim 13, wherein the second control logic is part of the at least one radio frequency device and is configured to cause the at least one radio frequency device to communicate information through the radio frequency transmit path to the at least one second antenna.

16. The device of claim 13, wherein:

the transmitter further comprises first and second buses from the at least one radio frequency device to the at least one switch;

the at least one radio frequency device is further configured to create and communicate first radio frequency signals defined by a first communication protocol over the first bus and second radio frequency signals defined by a second communication protocol over the second bus, the first radio frequency signals defined by the first communication protocol being the radio frequency signals in the selected one of the at least one transmission frequency bands;

the transmitter further comprises first and second power amplifiers and at least one duplex filter, each of the first and second power amplifiers coupled to the at least one second antenna, the second power amplifier coupled to the at least one second antenna through the at least one duplex filter;

the at least one switch is coupled to the first and second buses and is intermediate the at least one radio frequency device and the at least one duplex filter, the at least one switch configured to couple the first bus to the second power amplifier, thereby coupling the at least one duplex filter to the radio frequency transmit path for the first radio frequency signals, and to couple the first bus to the first power amplifier and the second bus to the second power amplifier, thereby decoupling the duplex filter from the radio frequency transmit path for the first radio frequency signals.

17. The device of claim 16, wherein the at least one switch comprises first and second switches, the first switch having inputs coupled to the first and second buses and an output coupled to an input of the second switch, the second switch having a first output coupled to the first power amplifier and a second output coupled to the second power amplifier.

18. The device of claim 16, wherein:

the second control logic is configured to create two control signals; and the at least one switch is responsive to the two control signals to couple the first bus to the second power amplifier when the two control signals are in a first state, to couple the first bus to the first power amplifier when the two control signals are in a second state, and to couple the second bus to the second power amplifier when the two control signals are in a third state.

19. The device of claim 16, wherein:

the first communication protocol is a global system for mobile communications protocol; and the second communication protocol is a code division multiple access protocol.

20. The device of claim 16, wherein:

the at least one transmission frequency band is defined by the first protocol to comprise first and second transmission frequency bands;

the second protocol defines radio frequency signals using the first and second transmission frequency bands;

the at least one duplex filter comprises a first duplex filter corresponding to the first transmission frequency band and a second duplex filter corresponding to the second transmission frequency band; and the second power amplifier is configured to route the first transmission frequency band to the first duplex filter and the second transmission frequency band to the second duplex filter.

21. The device of claim 16, wherein:

the at least one second antenna comprises two given antennas, wherein one given antenna is coupled to the first power amplifier, and the other given antenna is coupled to the at least one duplex filter.

22. The device of claim 16, wherein:

the at least one second antenna comprises a single antenna coupled to both the first and second power amplifiers.

23. The device of claim 1, wherein:
the at least one transmission frequency band comprises one or more of an 824 to 849 megahertz (MHz) frequency band and an 1850 to 1910 MHz frequency band; and
the reception frequency band comprises a 1670 to 1675 MHz frequency band.

24. The device of claim 1, wherein:
the at least one transmission frequency band comprises a 824 to 849 megahertz (MHz) frequency band and a 1850 to 1910 MHz frequency band;
the reception frequency band comprises a 1670 to 1675 MHz frequency band;
the at least one filter comprises a first filter to filter at least one harmonic caused by transmitting the 824 to 849 MHz frequency band and a second filter to filter wideband noise caused by transmitting the 1850 to 1910 MHZ frequency band.

25. The device of claim 1, wherein:
the at least one transmission frequency band comprises one or more of a 880 to 915 megahertz (MHz) frequency band, a 1710 to 1785 MHz frequency band, and a 1920 to 1980 MHz frequency band; and
the reception frequency band comprises a 470 to 702 MHz frequency band.

26. The device of claim 1, wherein:
the at least one transmission frequency band comprises one or more of a 824 to 849 megahertz (MHz) frequency band and a 1850 to 1910 MHz frequency band; and
the reception frequency band comprises a 1670 to 1675 MHz frequency band.

27. The device of claim 1, wherein:
the at least one transmission frequency band comprises at least one transmission frequency band defined by a global system for mobile communications standard; and
the reception frequency band comprises a reception frequency band defined by a digital video broadcasting handheld standard.

28. The device of claim 1, wherein:
the at least one transmission frequency band comprises at least one transmission frequency band defined by a code division multiple access standard; and
the reception frequency band comprises a reception frequency band defined by a digital video broadcasting handheld standard.

29. The device of claim 1, wherein:
the at least one transmission frequency band comprises at least one transmission frequency band defined by a wideband code division multiple access standard; and
the reception frequency band comprises a reception frequency band defined by a digital video broadcasting handheld standard.

30. The device of claim 1, wherein:
the at least one transmission frequency band comprises at least one transmission frequency band defined by a CDMAOne or CDMA2000 standard; and
the reception frequency band comprises a reception frequency band defined by a digital video broadcasting handheld standard.

31. The device of claim 1, wherein the transmitter further comprises a front end module, in the radio frequency transmit path, comprising a power amplifier, and wherein the second control logic is further responsive to the notification to adjust biasing of the power amplifier.

32. The device of claim 1, wherein the first control logic is configured to generate the notification of the receiver being able to receive the reception frequency band when one or more of the following is true:
the receiver is coupled to the transmitter;
the receiver is in a reception mode; and
the receiver is receiving information in the reception frequency band.

33. The device of claim 13, wherein:
the transmitter further comprises first and second power amplifiers, outputs of each of the first and second power amplifiers coupled to selected inputs of the at least one switch;
an output of the at least one filter is coupled to a given one of the at least one second antennas;
the transmitter further comprises a first bus from the at least one radio frequency device to an input of the first power amplifier and a second bus from the at least one radio frequency device to an input of the second power amplifier;
the at least one radio frequency device is further configured to create and communicate first radio frequency signals defined by a first communication protocol over the first bus and second radio frequency signals defined by a second communication protocol over the second bus, the first radio frequency signals defined by the first communication protocol being the radio frequency signals in the selected one of the at least one transmission frequency bands; and
the at least one switch is coupled through the selected inputs to the outputs of the first and second power amplifiers and is intermediate the first and second power amplifiers and the at least one second antenna, the at least one switch configured to couple in a first state the output of the first power amplifier to an input of the at least one filter, to couple in a second state the output of the first power amplifier to a coupling coupled to a selected one of the at least one second antennas but not coupled to the at least one filter, and to couple in a third state the second power amplifier to the input of the at least one filter, whereby in the first state the at least one filter is coupled to the radio frequency transmit path for the first radio frequency signals and in the second and third states the at least one filter is uncoupled from the radio frequency transmit path for the first radio frequency signals.

34. The device of claim 33, wherein:
the first communication protocol is a global system for mobile communications protocol;
the second communication protocol is a wide-band code division multiple access protocol; and
the reception frequency band comprises a reception frequency band defined by a digital video broadcasting standard.

35. The device of claim 33, wherein:
the first control logic generates a second notification of the receiver not being able to receive the reception frequency band;
the second control logic is responsive to the notification and to whether the first radio frequency signals are to be transmitted over the radio frequency transmit path to cause the at least one switch to operate in the first state;
the second control logic is responsive to the second notification and to whether the first radio frequency signals are to be transmitted over the radio frequency transmit path to cause the at least one switch to operate in the second state; and
the second control logic is responsive to whether the second radio frequency signals are to be transmitted over the radio frequency transmit path to cause the at least one switch to operate in the third state.

36. The device of claim 33, wherein:

the at least one second antenna comprises a single antenna; and each of the given and selected second antennas is the single antenna.

37. The device of claim 33, wherein the given and selected second antennas are separate antennas.

38. The device of claim 13, wherein:

the transmitter further comprises a power amplifier, an output of the power amplifier coupled to a selected input of the at least one switch;

an output of the at least one filter is coupled to a given one of the at least one second antennas;

the transmitter further comprises a bus from the at least one radio frequency device to an input of the power amplifier;

the at least one radio frequency device is further configured to create and communicate first radio frequency signals defined by a first communication protocol over the bus and second radio frequency signals defined by a second communication protocol over the bus, the first radio frequency signals defined by the first communication protocol being the radio frequency signals in the selected one of the at least one transmission frequency bands;

the at least one switch is coupled through the selected input to the output of the power amplifier and is intermediate the power amplifier and the at least one second antenna, the at least one switch configured to couple in a first state the output of the power amplifier to an input of the at least one filter and to couple in a second state the output of the power amplifier to a coupling coupled to a selected one of the at least one second antennas but not coupled to the at least one filter; and the second control logic is responsive to the notification and to whether the first radio frequency signals are to be transmitted over the radio frequency transmit path to cause the at least one switch to couple the output of the power amplifier to an input of the at least one filter, thereby coupling the at least one filter to the radio frequency transmit path for the first radio frequency signals.

39. The device of claim 38, wherein:

the first communication protocol is a global system for mobile communications protocol;

the second communication protocol is a wide-band code division multiple access protocol; and the reception frequency band comprises a reception frequency band defined by a digital video broadcasting standard.

40. The device of claim 38, wherein:

the first control logic generates a second notification of the receiver not being able to receive the reception frequency band;

the second control logic is responsive to the second notification and to whether the first radio frequency signals are to be transmitted over the radio frequency transmit path to cause the at least one switch to couple the output of the power amplifier to a coupling coupled to the selected one of the at least one second antennas but not coupled to the at least one filter, thereby decoupling the at least one filter from the radio frequency transmit path for the first radio frequency signals; and the second control logic is responsive to whether the second radio frequency signals are to be transmitted over the radio frequency transmit path to cause the at least one switch to couple the output of the power amplifier to an input of the at least one filter.

41. The device of claim 38, wherein:

the at least one second antenna comprises a single antenna; and each of the given and selected antennas is the single antenna.

42. The device of claim 38, wherein the given and selected second antennas are separate antennas.

43. A method comprising:

receiving a notification of a receiver being able to receive a reception frequency band from a first antenna;

modifying, in response to the notification, a radio frequency transmit path to couple a given one of at least one filters or to decouple the given filter from the radio frequency transmit path; and transmitting information in a selected one of at least one transmission frequency bands and through the modified radio frequency transmit path to at least one second antenna, where the modified radio frequency transmit path is selected to reduce interference between the transmission frequency band using the modified radio frequency transmit path and the reception frequency band.

44. A signal bearing medium tangibly embodying a program of machine-readable instructions executable by an apparatus to perform operations comprising the steps of:

receiving a notification of a receiver being able to receive a reception frequency band from a first antenna;

modifying, in response to the notification, a radio frequency transmit path to couple a given one of at least one filters or to decouple the given filter from the radio frequency transmit path; and transmitting information in a selected one of at least one transmission frequency bands and through the modified radio frequency transmit path to at least one second antenna, where the modified radio frequency transmit path is selected to reduce interference between the transmission frequency band using the modified radio frequency transmit path and the reception frequency band.

45. The device of claim 1, where the device is a mobile station.

* * * * *